US006766454B1

United States Patent
Riggins

(10) Patent No.: US 6,766,454 B1
(45) Date of Patent: *Jul. 20, 2004

(54) SYSTEM AND METHOD FOR USING AN AUTHENTICATION APPLET TO IDENTIFY AND AUTHENTICATE A USER IN A COMPUTER NETWORK

(75) Inventor: Mark D. Riggins, San Jose, CA (US)

(73) Assignee: Visto Corporation, Redwood Shores, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/899,277

(22) Filed: Jul. 23, 1997

Related U.S. Application Data

(63) Continuation-in-part of application No. 08/841,950, filed on Apr. 8, 1997.

(51) Int. Cl.[7] .................................................. H04K 1/00
(52) U.S. Cl. ....................... 713/185; 713/200; 713/201; 713/202
(58) Field of Search ............................. 380/25, 49, 23, 380/24, 10; 395/186, 187.01, 188.01, 200.59, 200.33; 364/286.5; 713/200, 201, 202, 6; 709/201, 203, 229, 99; 1713/103, 168, 252

(56) References Cited

U.S. PATENT DOCUMENTS

| 4,652,698 A | * | 3/1987 | Hale et al. ..................... 380/24 |
| 4,831,582 A | | 5/1989 | Miller et al. ................. 707/104 |
| 4,897,781 A | | 1/1990 | Chang et al. ................ 364/200 |
| 4,916,738 A | * | 4/1990 | Chandra et al. ............ 713/159 |
| 5,048,085 A | * | 9/1991 | Abraham et al. ............. 380/23 |
| 5,220,603 A | | 6/1993 | Parker .......................... 380/21 |

(List continued on next page.)

FOREIGN PATENT DOCUMENTS

| CA | 2191505 | 6/1997 | ............ H04M/3/42 |
| CA | 2210763 | 1/1999 | |
| EP | 0801478 | 10/1997 | |

OTHER PUBLICATIONS

US 5,373,559, 12/1994, Kaufman et al. (withdrawn)
Jaegar and Prakash, Implementation of a Discretioonary Access Control Model for Script–based Systems, IEEEE Jun. 1995.*

(List continued on next page.)

Primary Examiner—Gregory Morse
Assistant Examiner—James Seal
(74) Attorney, Agent, or Firm—Manatt, Phelps & Phillips, LLP

(57) ABSTRACT

The system includes a server coupled via a computer network to a client. Upon receiving a request for access, the server sends an authentication applet to the client. The authentication applet includes a user identification (ID) module for obtaining a user ID and a password module for obtaining a client password. The authentication applet also includes a response generator coupled to the password module for using the client password as a variable in an algorithm to compute a client response. The authentication applet further includes a communications module coupled to the response generator and to the user ID module for sending the client response and the user ID back to the server for verifying the response and authenticating the user. The client uses an applet engine to execute the applet. The server uses the user ID to retrieve user information, and uses the user information as a variable in an algorithm to generate a verification response. If the verification response is the same as the client response, then the identity of the user is verified and access may be granted.

54 Claims, 15 Drawing Sheets

U.S. PATENT DOCUMENTS

| | | | |
|---|---|---|---|
| 5,263,157 A | 11/1993 | Janis | 707/9 |
| 5,388,255 A | 2/1995 | Pytlik et al. | |
| 5,420,927 A | 5/1995 | Micali | 380/23 |
| 5,425,102 A | 6/1995 | Moy | |
| 5,434,918 A * | 7/1995 | Kung et al. | 380/25 |
| 5,491,752 A * | 2/1996 | Kaufman et al. | 380/30 |
| 5,495,533 A * | 2/1996 | Linehan et al. | 380/21 |
| 5,510,777 A | 4/1996 | Pilc et al. | |
| 5,544,320 A | 8/1996 | Konrad | |
| 5,544,322 A | 8/1996 | Cheng et al. | 395/200.12 |
| 5,572,643 A | 11/1996 | Judson | 395/793 |
| 5,581,749 A | 12/1996 | Hossain et al. | 707/1 |
| 5,588,132 A | 12/1996 | Cardoza | |
| 5,613,012 A | 3/1997 | Hoffman et al. | 382/115 |
| 5,623,601 A | 4/1997 | Vu | 395/187.01 |
| 5,627,658 A | 5/1997 | Connors et al. | 358/407 |
| 5,644,354 A | 7/1997 | Thompson et al. | 348/13 |
| 5,647,002 A | 7/1997 | Brunson | 380/49 |
| 5,657,390 A | 8/1997 | Elgamal et al. | 380/49 |
| 5,666,530 A | 9/1997 | Clark et al. | 395/617 |
| 5,666,553 A | 9/1997 | Crozier | 395/803 |
| 5,675,782 A | 10/1997 | Montague et al. | |
| 5,682,478 A | 10/1997 | Watson et al. | 395/200.12 |
| 5,682,524 A | 10/1997 | Freund et al. | 395/605 |
| 5,684,990 A | 11/1997 | Boothby | 707/203 |
| 5,701,423 A | 12/1997 | Crozier | 395/335 |
| 5,706,427 A | 1/1998 | Tabuki | 395/187.01 |
| 5,706,502 A | 1/1998 | Foley et al. | 707/10 |
| 5,715,403 A | 2/1998 | Stefik | 705/44 |
| 5,721,779 A * | 2/1998 | Funk | 380/23 |
| 5,757,916 A | 5/1998 | MacDoran et al. | 380/25 |
| 5,764,902 A | 6/1998 | Rothrock | |
| 5,778,346 A | 7/1998 | Frid-Nielsen et al. | 395/208 |
| 5,784,463 A * | 7/1998 | Chen et al. | 380/21 |
| 5,784,464 A * | 7/1998 | Akiyama et al. | 380/25 |
| 5,787,172 A | 7/1998 | Arnold | 380/21 |
| 5,799,086 A | 8/1998 | Sudia | 380/23 |
| 5,812,773 A | 9/1998 | Norin | |
| 5,818,935 A * | 10/1998 | Maa | 380/200 |
| 5,828,840 A | 10/1998 | Cowan et al. | 395/200.33 |
| 5,835,601 A | 11/1998 | Shimbo et al. | |
| 5,862,346 A | 1/1999 | Kley et al. | |
| 5,870,544 A | 2/1999 | Curtis | 395/187.01 |
| 5,924,103 A | 7/1999 | Ahmed et al. | |
| 5,943,676 A | 8/1999 | Boothby | |
| 5,951,652 A | 9/1999 | Ingrassia et al. | 709/248 |
| 5,974,238 A | 10/1999 | Chase, Jr. | |
| 5,982,898 A | 11/1999 | Hsu et al. | 380/23 |
| 5,999,947 A | 12/1999 | Zollinger et al. | 707/203 |
| 6,020,885 A | 2/2000 | Honda | |
| 6,154,844 A | 11/2000 | Touboul et al. | |
| 6,212,529 B1 | 4/2001 | Boothby et al. | |
| 6,343,313 B1 | 1/2002 | Salesky et al. | |

OTHER PUBLICATIONS

Charlotte Adams, Multilevel Secure Networking Charges Ahead, Federal Computer Week, Apr. 12, 1993.*

John Kohl, The Evolution of the Kerberos Authentication Service, 1991.*

Mark R. Brown et al. "Using Netscape 2", 2nd edition, QUE Corporation, 1995.*

Chapter 34 "SUN's JAVA and the Netscape Browser" pp. 885–907.*

Young, Adam et al.; "Deniable Password Snatching: On the Possibility of Evasive Electronic Espionage"; 1997 IEEE; pp. 224–235.

Article by Bellovin et al., entitled: "Network Firewalls" Published by IEEE Communications Magazine Sep. 1994, pp. 50–57.

Article by Steffen Stempel, entitled: "IPAccess–An Internet Service Access System for Firewall Installations" Published by IEEE Communications Magazine Feb. 16, 1995, pp. 31–41.

Article by Braun et al., entitled: "Web Traffic Characterization: an assessment of the impact of caching documents from NCSA's web server" Published by Elsevier Science B.V. 1995 pp. 37–51.

Article by Nelson et al., entitled: "Security for Infinite Networks" Published by IEEE Communications Magazine on Aug. 22, 1995, pp. 11–19.

Article by Greenwald et al., entitled: "Designing an Academic Firewall: Policy, Practice, and Experience with SURF" Published by IEEE Communications Magazine on Feb. 22, 1996, pp. 79–92.

Article by Kiuchi et al., entitled: "C–HTTP—The Development of a Secure, Closed HTTP–based Network on the Internet" Published by IEEE Proceedings of SNDSS on Feb. 22, 1996, pp. 64–75.

Article by S. Cobb, entitled: "Establishing Firewall Policy" Published by National Computer Security Assn. on Jun. 25–27, 1996, pp. 198–205.

Tanenbaum, Andrew S., "Computer Network", Third Edition, Prentice–Hall 1996, ISBN 0–13–349945–6, Chapter 7, Sections 7.1.4 to 7.1.6, pp. 597–618.

Knudsen, Jonathan, "Java Cryptography", First Edition, O'Reilly & Assoc. 1998, ISBN 1–56592–402–9, pp. 79–91.

Web page: www.verisign.com/press/product/isv.html, Verisign Press Release, "Verisign Enhances Digital IDS to Enable Universal Website Login and One–Step Registration", Nov. 3, 1998, 3 pages.

* cited by examiner

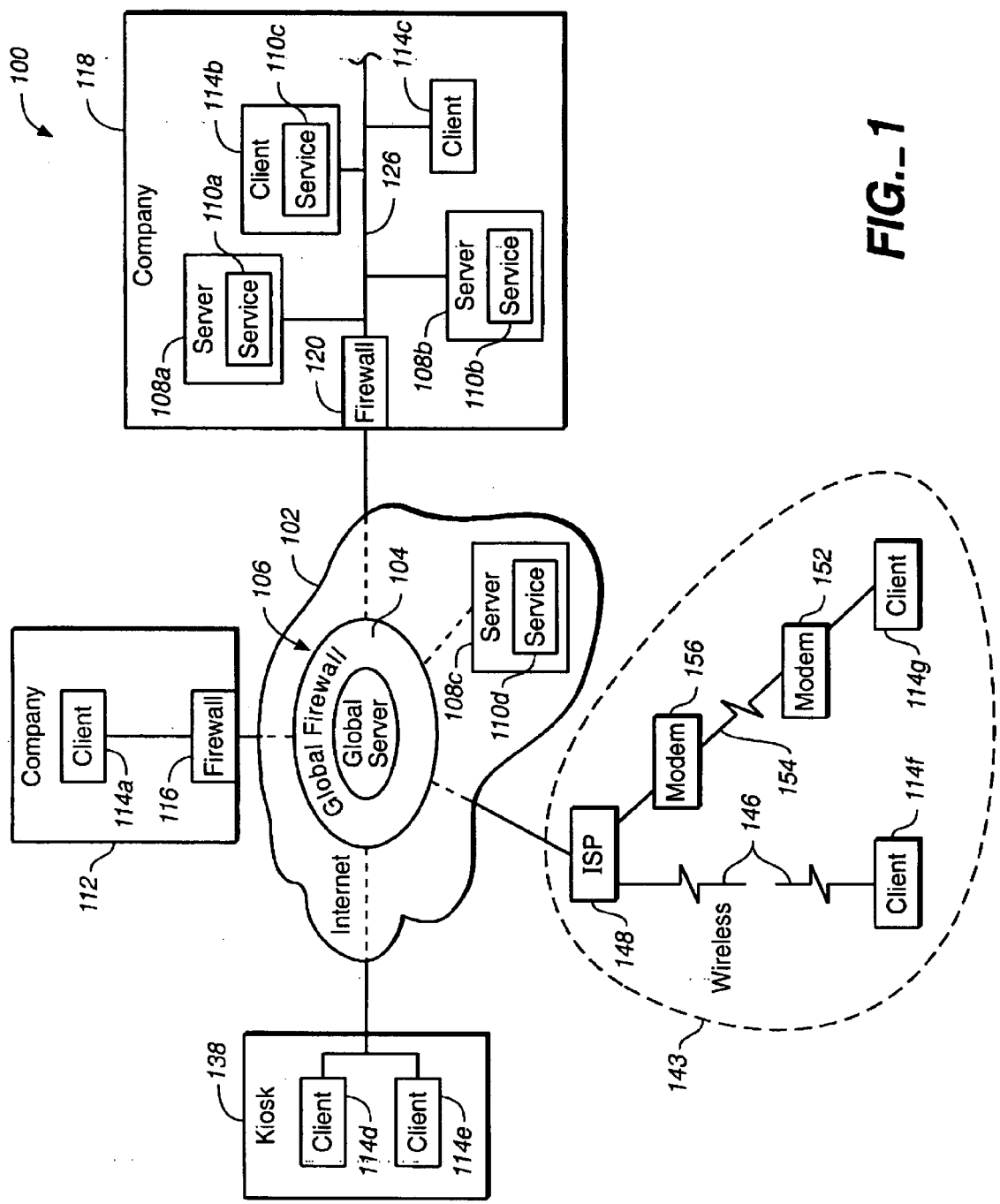
FIG._1

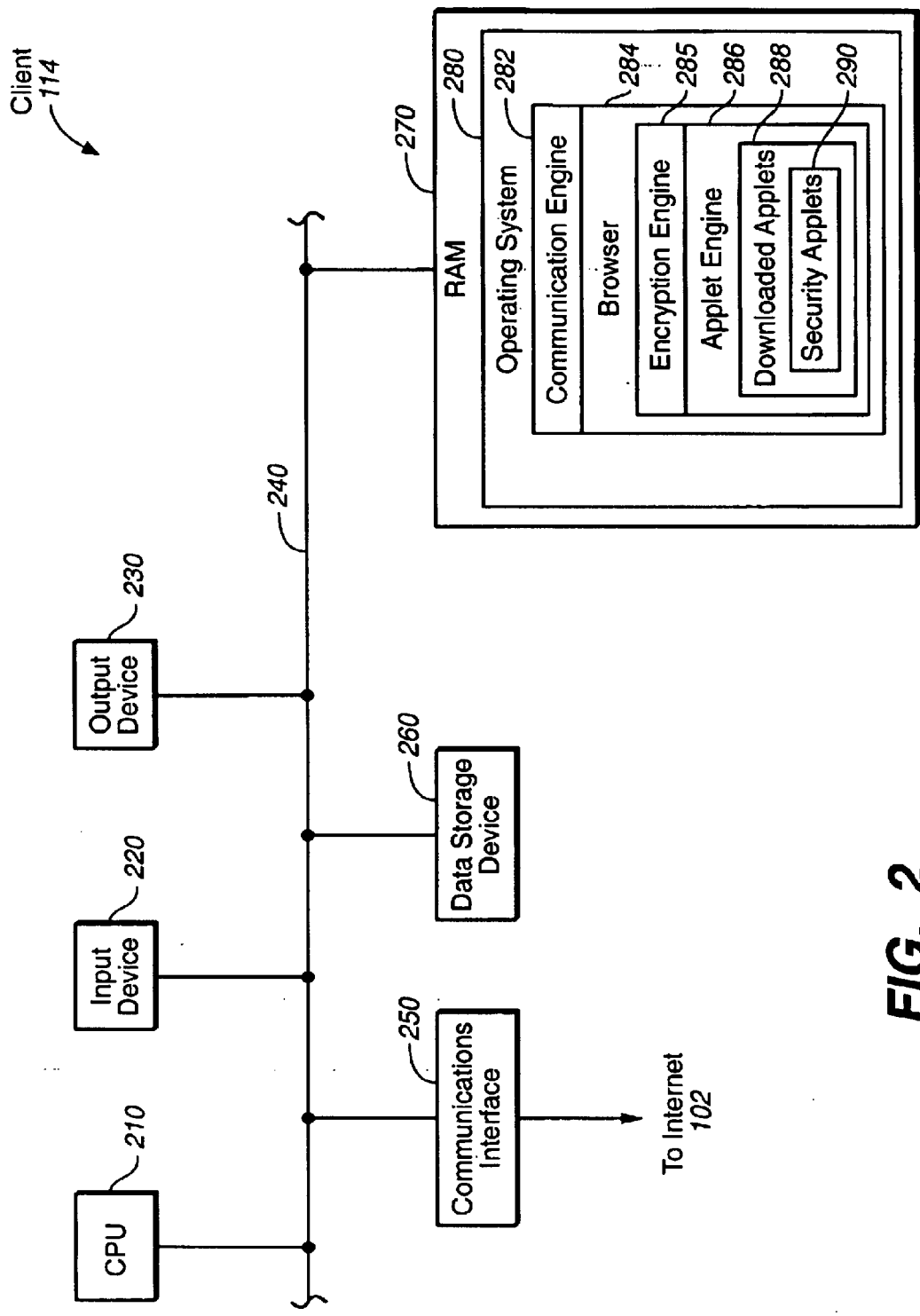
FIG._2

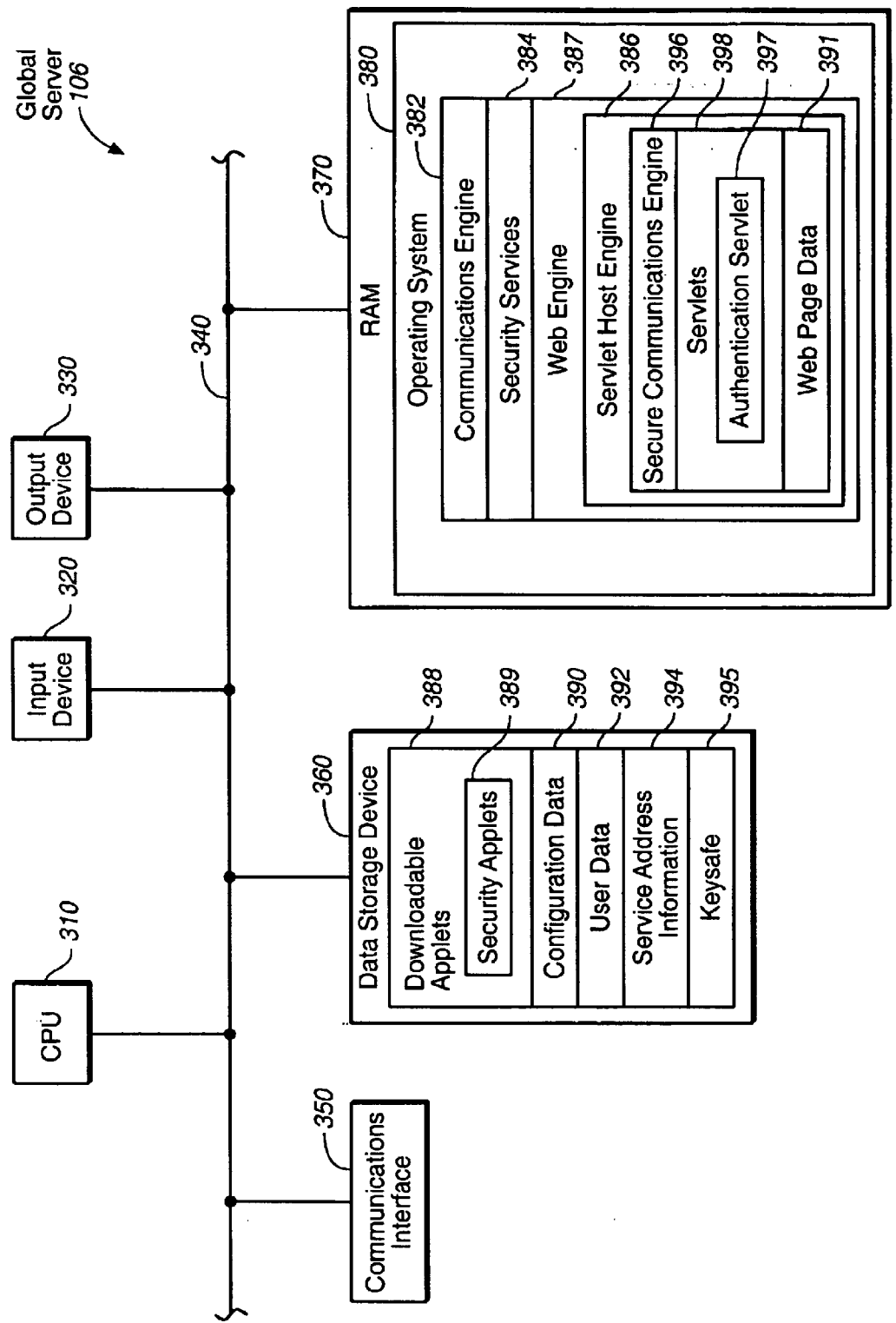
FIG._3

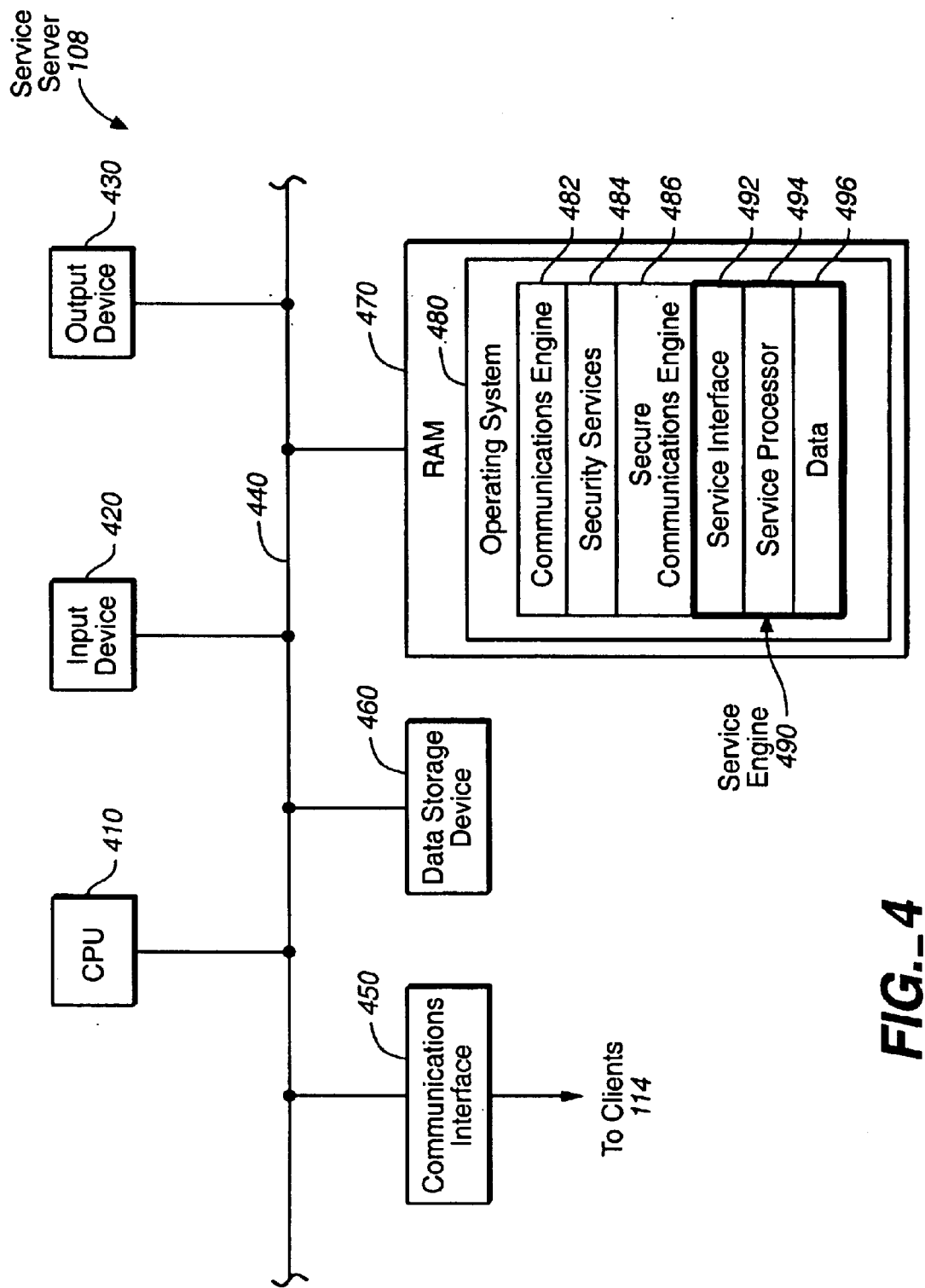
FIG._4

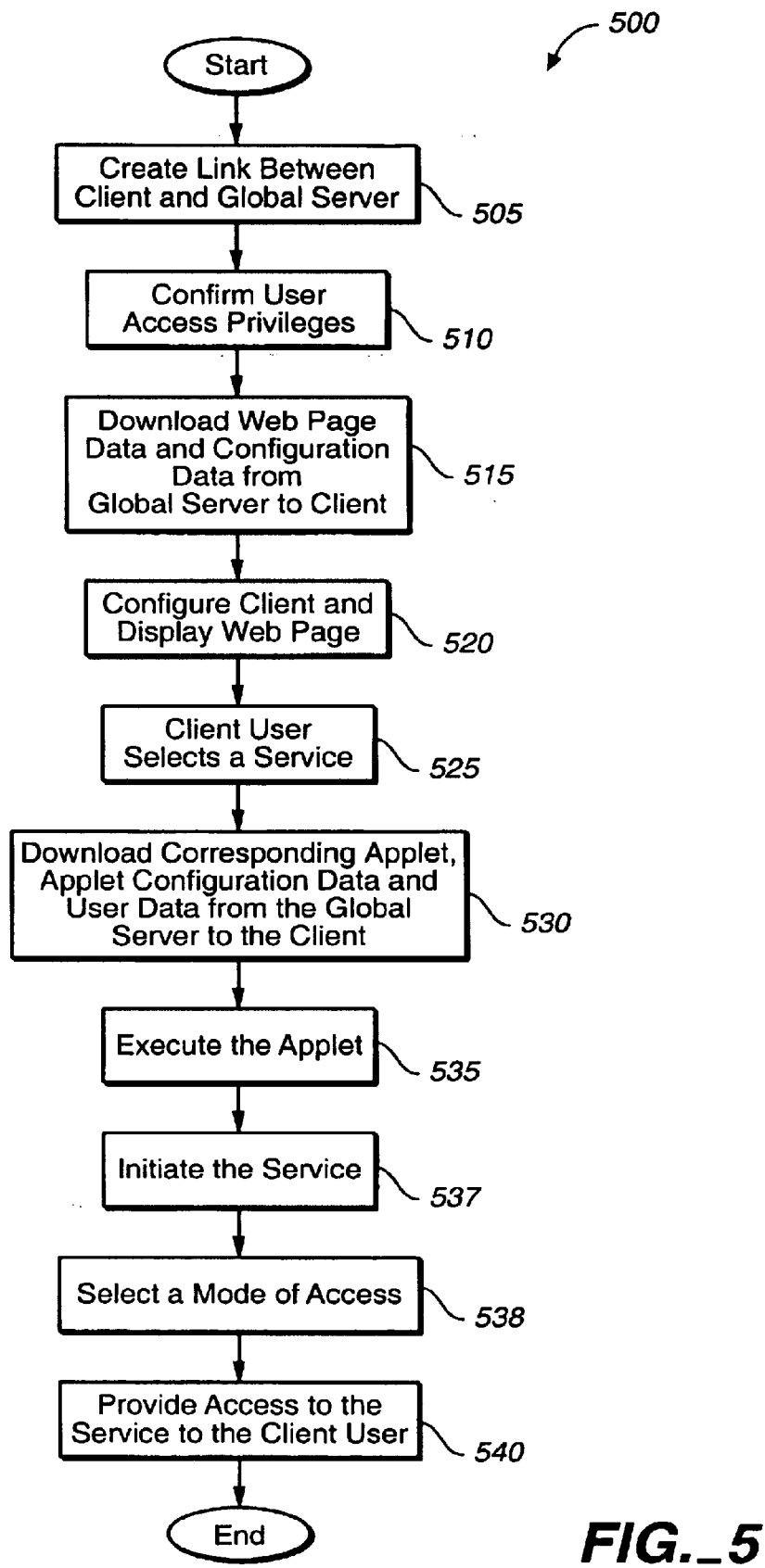
FIG._5

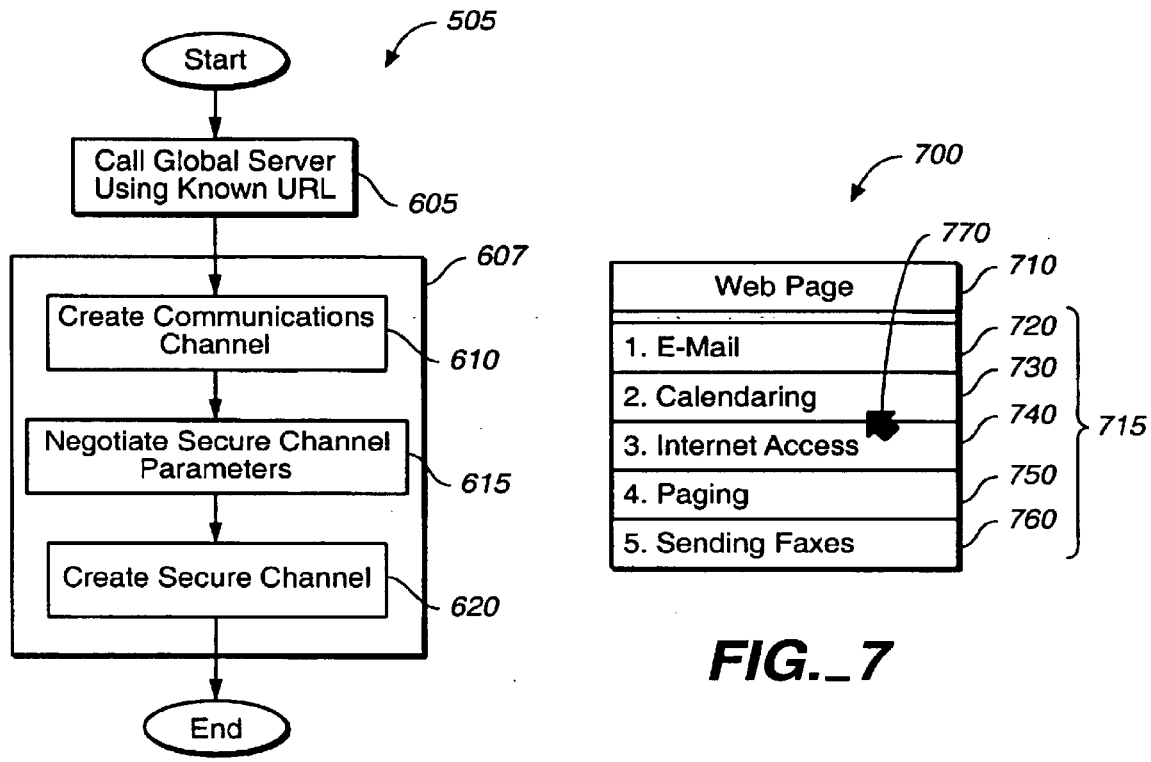
FIG._6
FIG._7
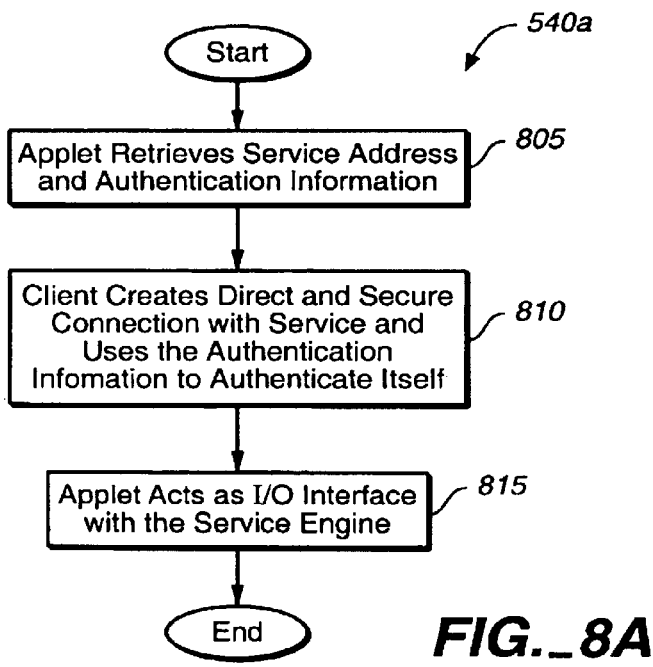
FIG._8A

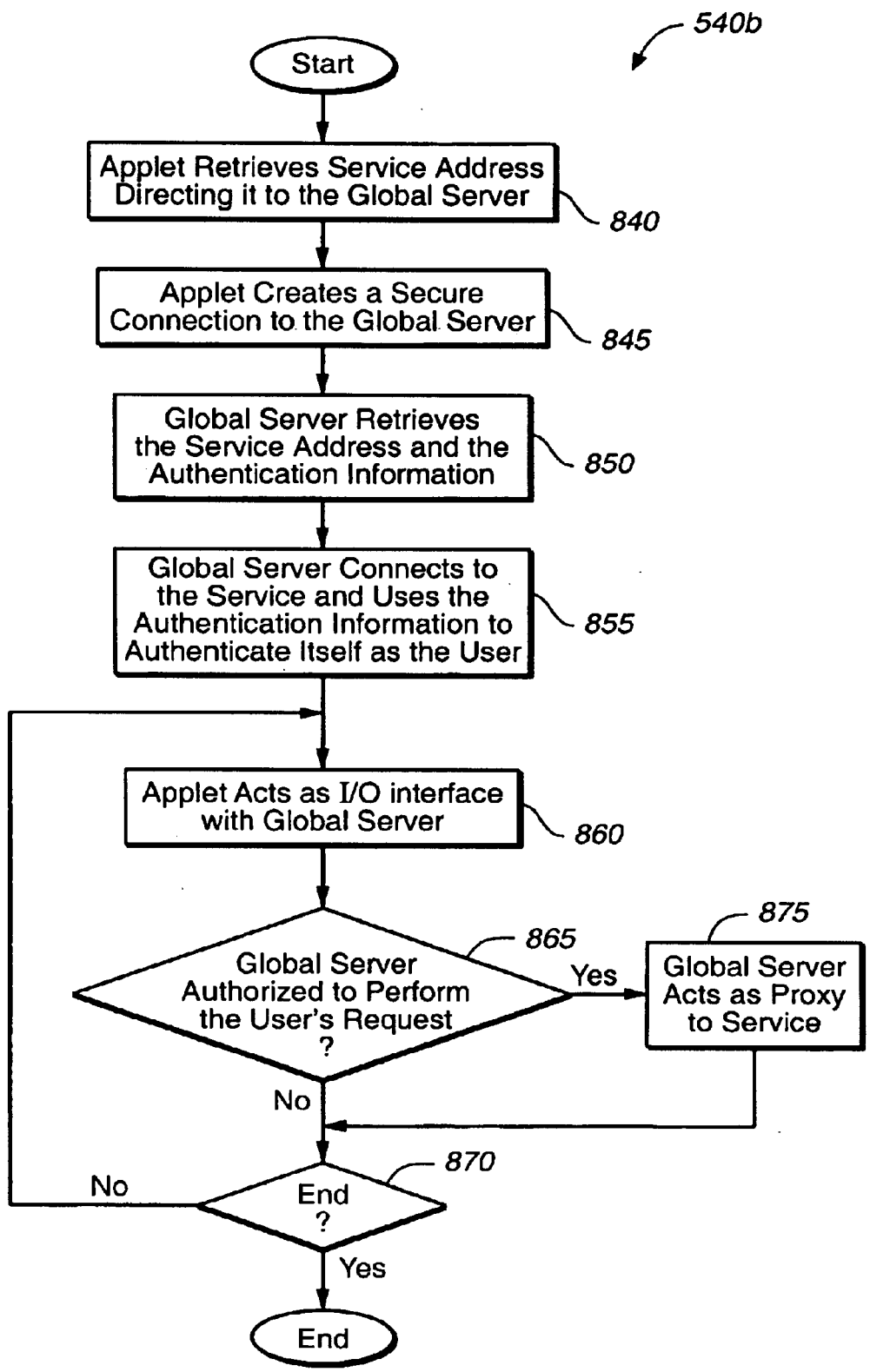
FIG._8B

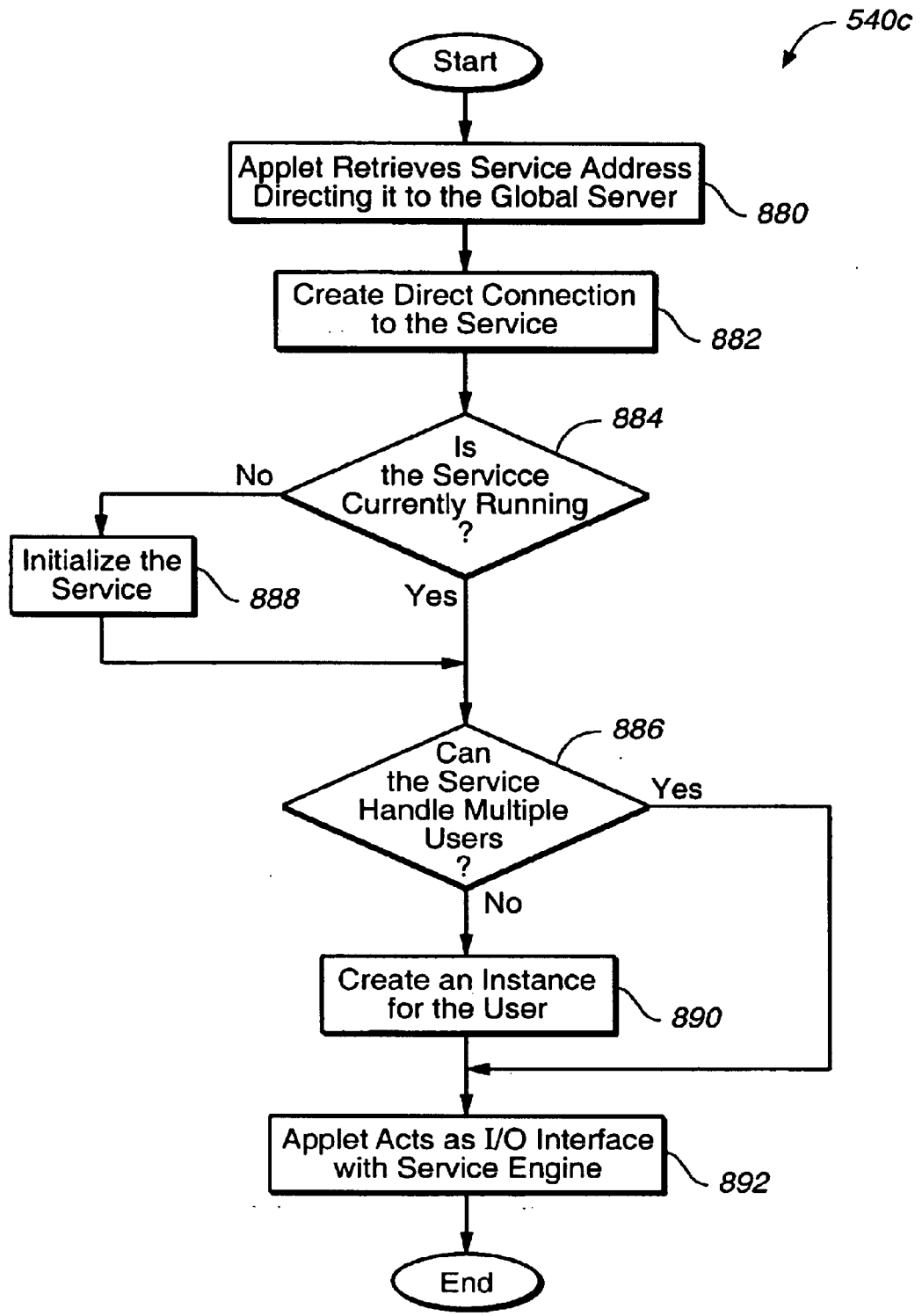
FIG._8C

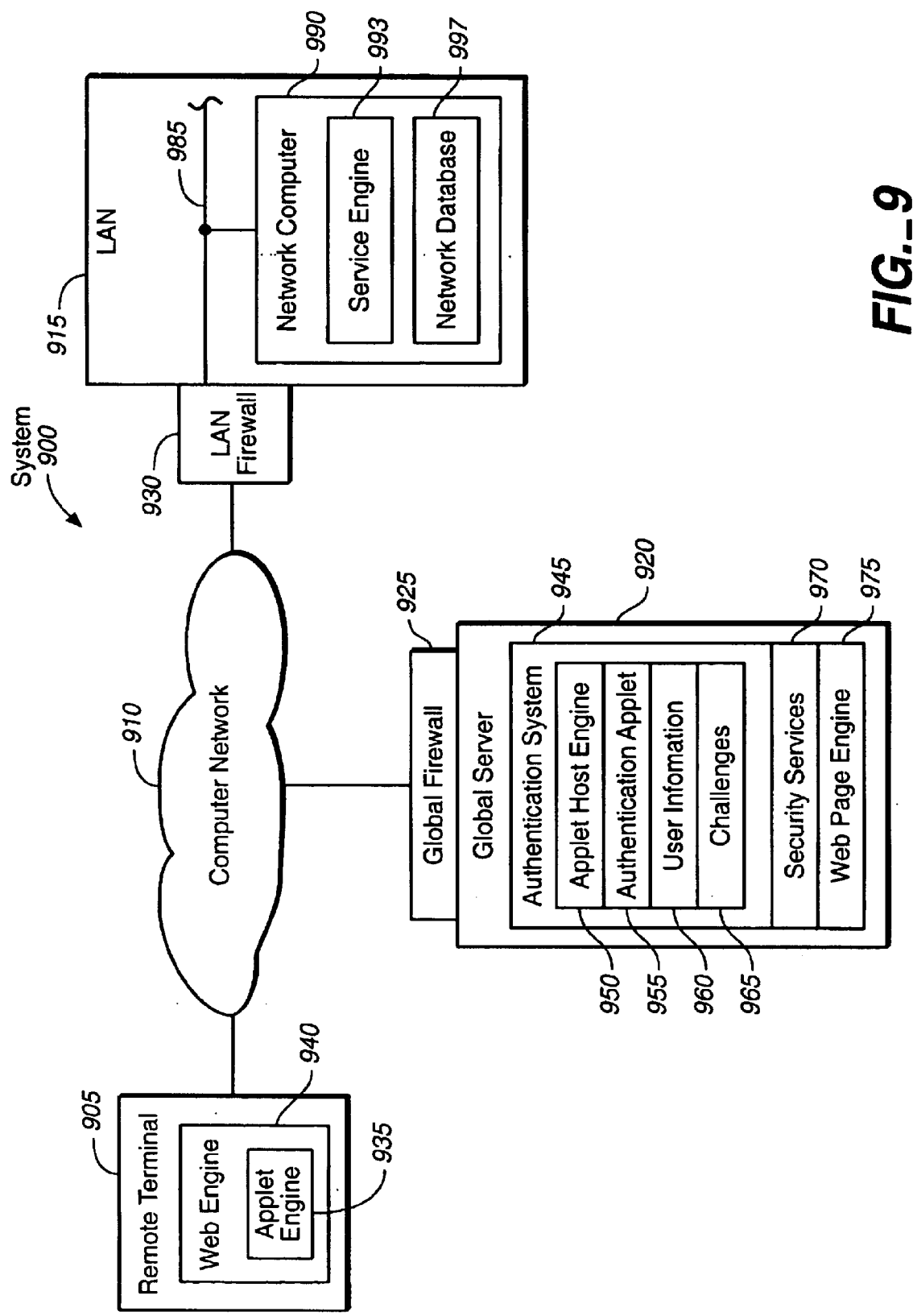
FIG._9

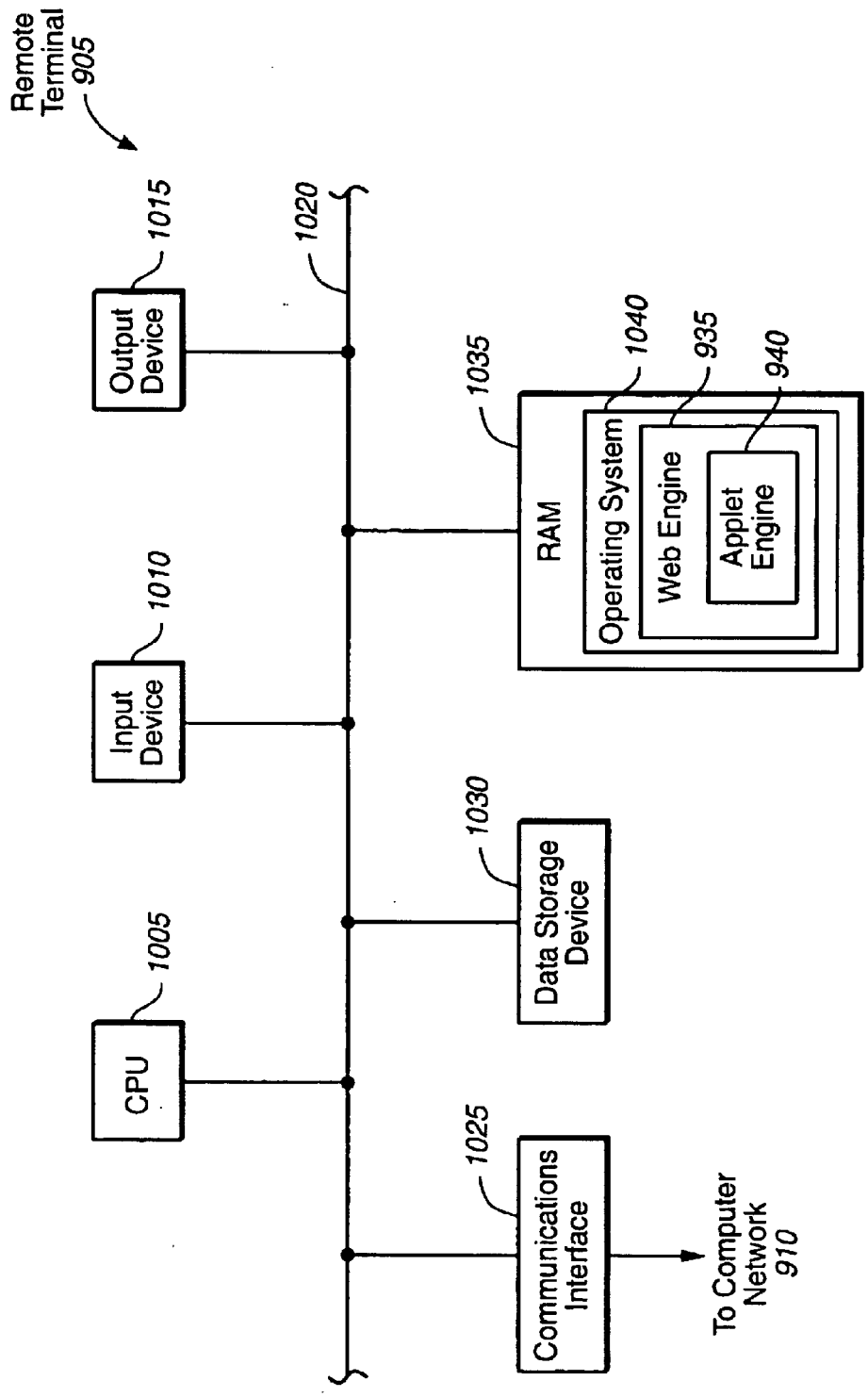
FIG._10

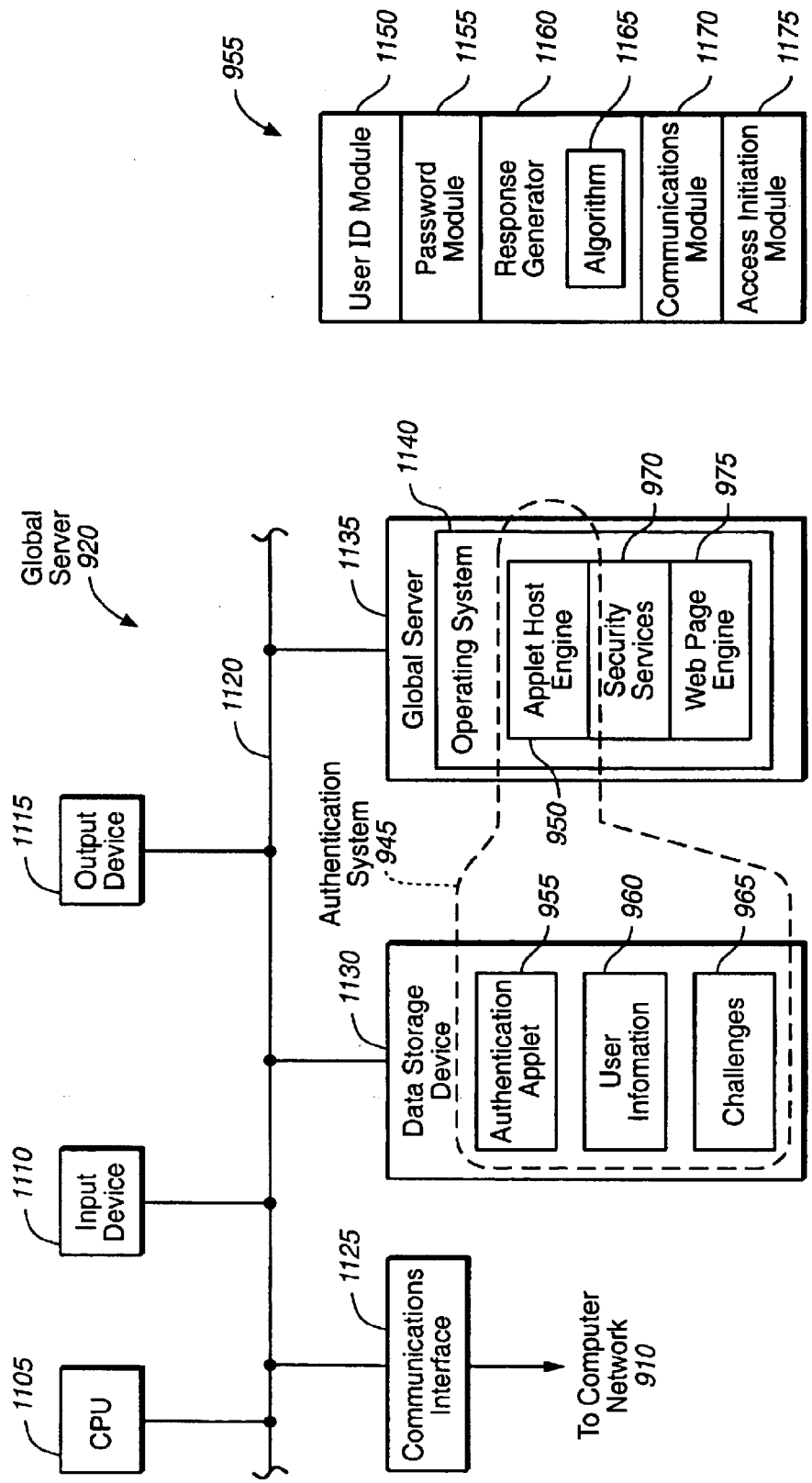
FIG._11B
FIG._11A

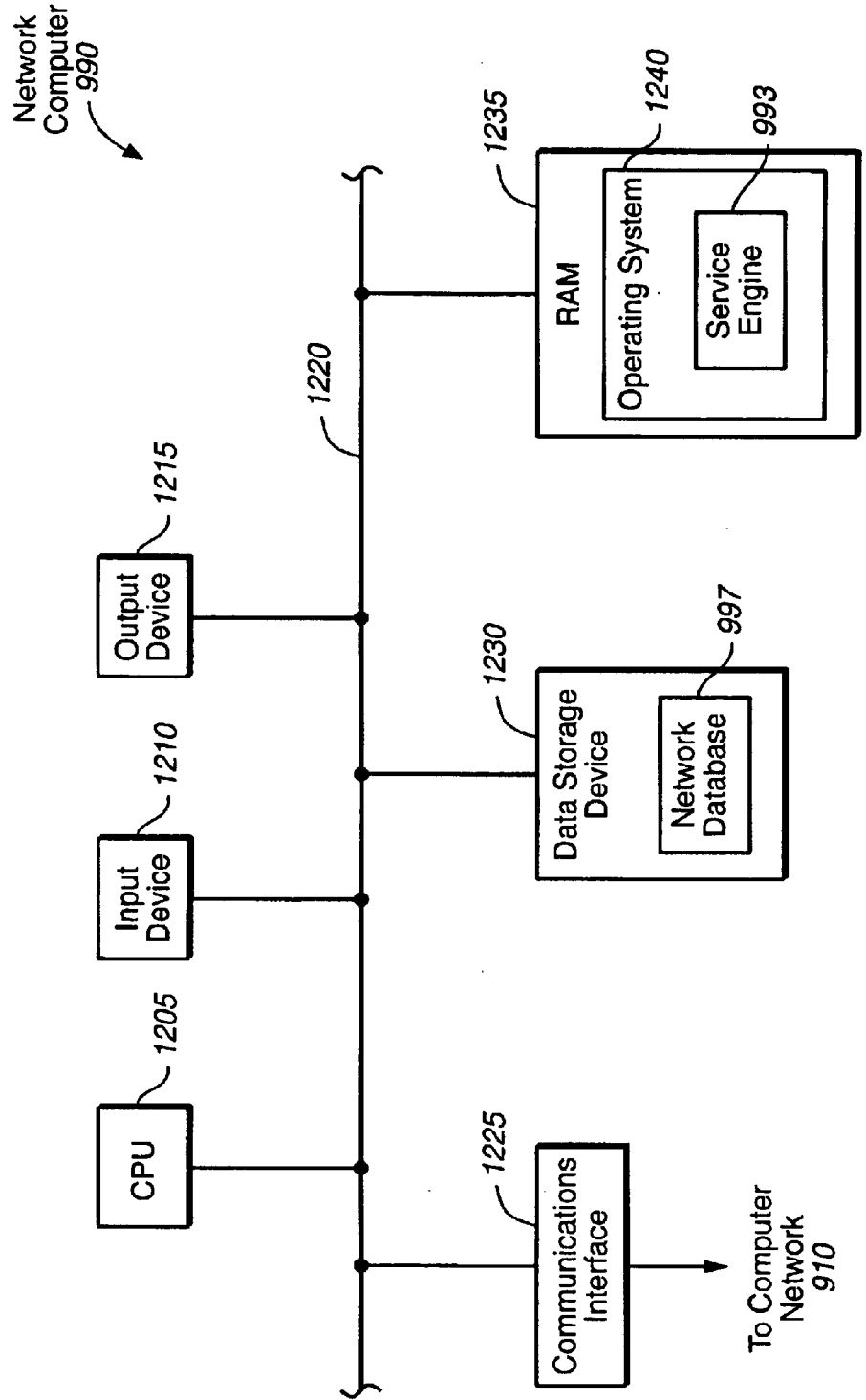
FIG._12

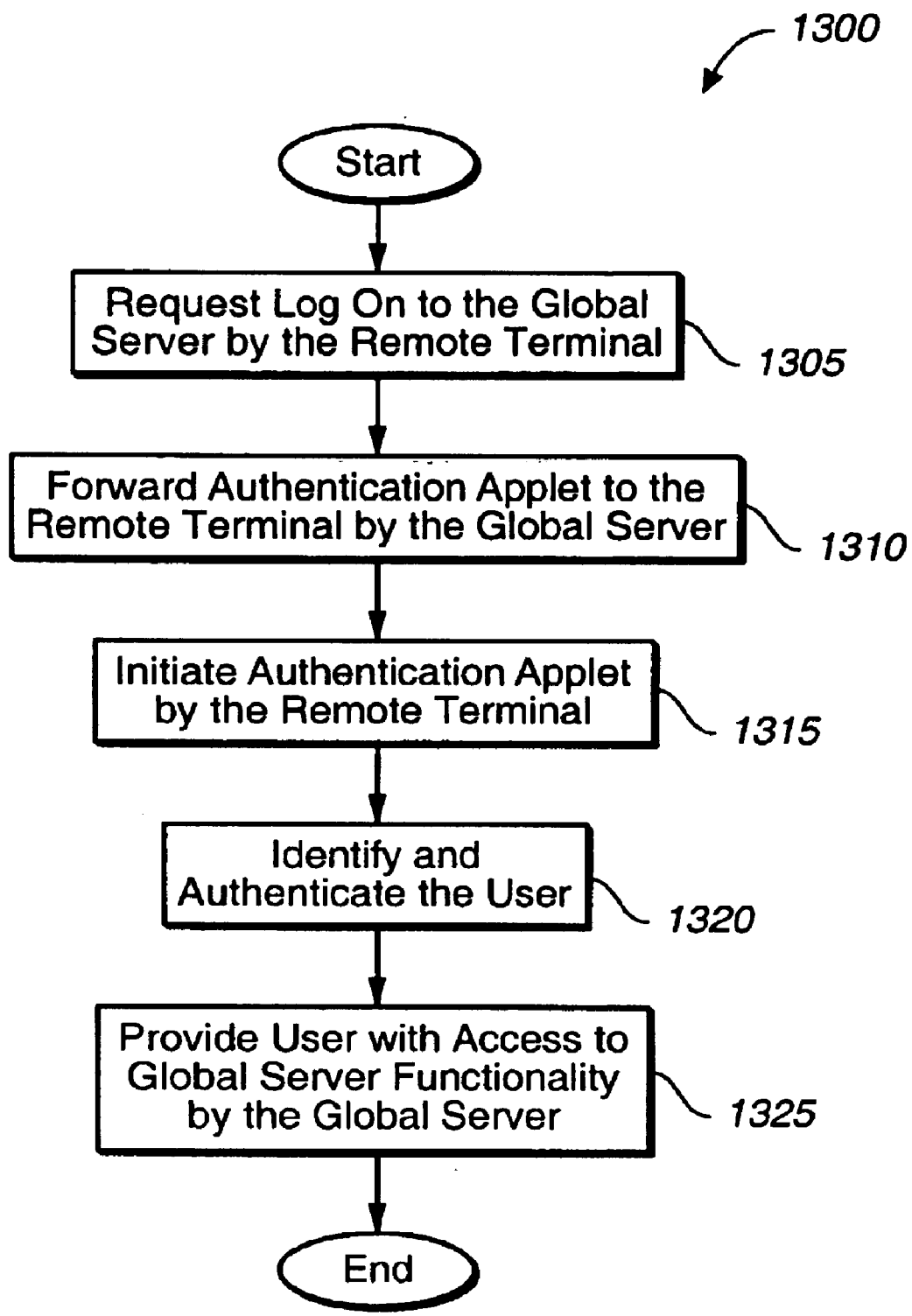
FIG._13

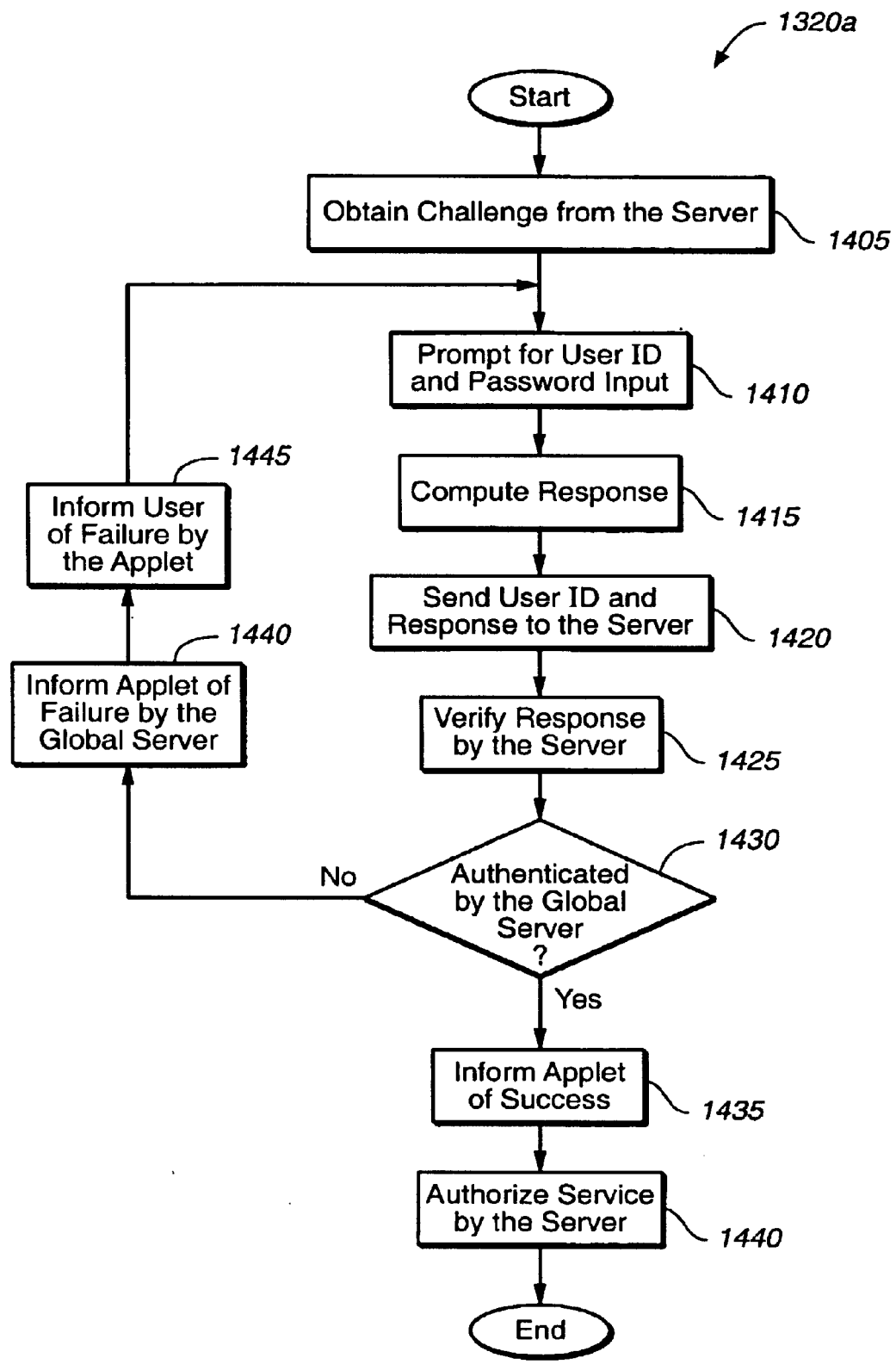
FIG._14

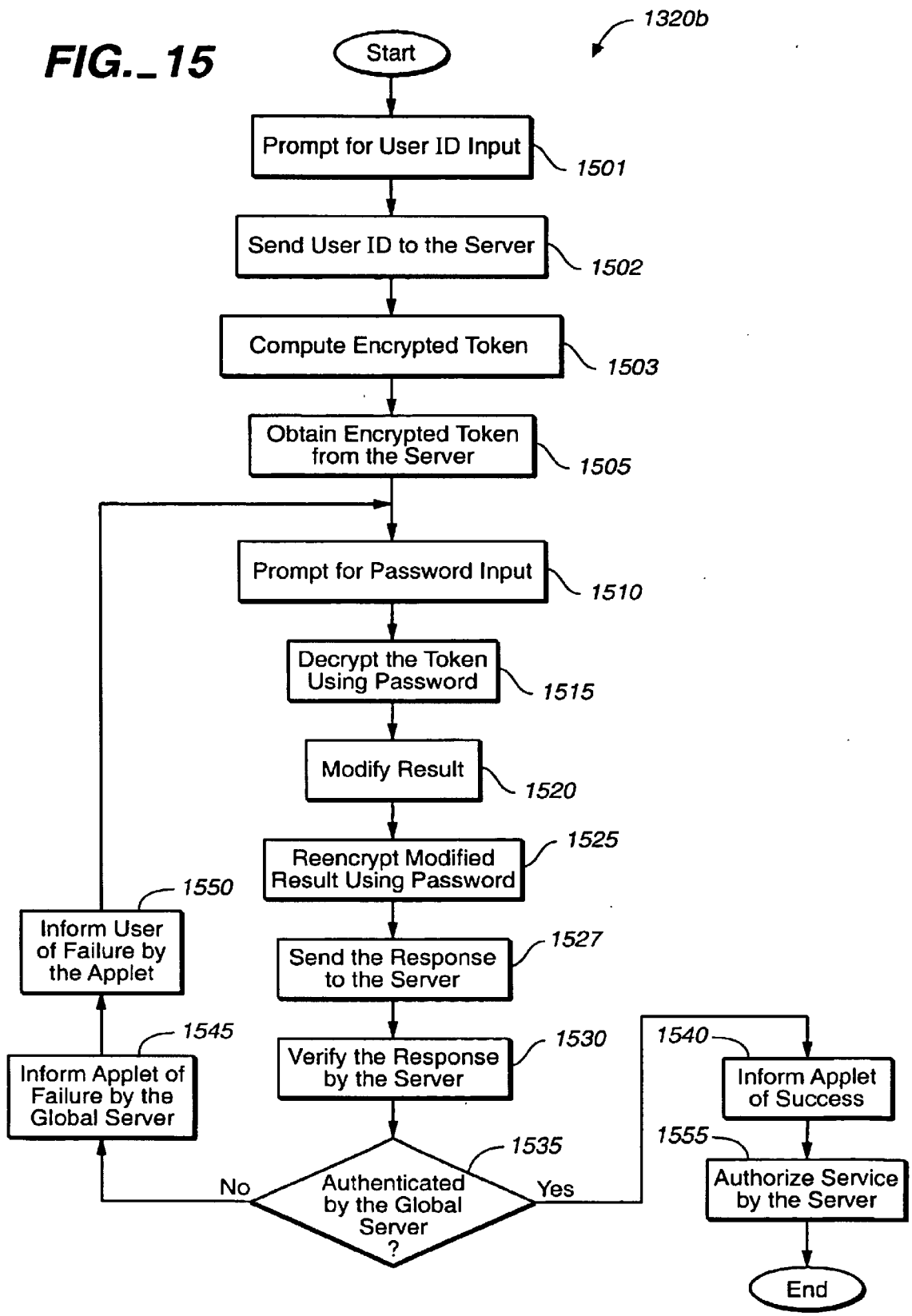
FIG._15

SYSTEM AND METHOD FOR USING AN AUTHENTICATION APPLET TO IDENTIFY AND AUTHENTICATE A USER IN A COMPUTER NETWORK

CROSS-REFERENCE TO RELATED APPLICATIONS

This application is a continuation-in-part of co-pending patent application Ser. No. 08/841,950, entitled "System and Method for Enabling Secure Access to Services in a Computer Network," filed on Apr. 8, 1997, by inventor Mark D. Riggins, which is assigned to RoamPage, Inc. and fully incorporated herein by reference as if repeated verbatim immediately hereafter. This parent application is to be a continuation-in-part of co-pending patent application Ser. No. 08/766,307, entitled "System and Method for Globally Accessing Computer Services," filed on Dec. 13, 1996, by inventor Mark Riggins, et al. These applications have also been assigned to RoamPage, Inc. Benefit of the earlier filing dates is claimed with respect to all common subject matter.

BACKGROUND OF THE INVENTION

1. Field of the Invention

This invention relates generally to computer networks, and more particularly to a system and method for securing access to services in a computer network.

2. Description of the Background Art

In its infancy, the Internet provided a research-oriented environment where users and hosts were interested in a free and open exchange of information, and where users and hosts mutually trusted one another. However, the Internet has grown dramatically, currently interconnecting about 100,000 computer networks and several million users. Because of its size and openness, the Internet has become a target of data theft, data alteration and other mischief.

Virtually everyone on the Internet is vulnerable. Before connecting to the Internet, companies balance the rewards of an Internet connection against risks of a security breach. Current security techniques help provide client and server authentication, data confidentiality, system integrity and system access control.

The most popular of the current security techniques is a firewall, which includes an intermediate system positioned between a trusted network and the Internet. The firewall represents an outer perimeter of security for preventing unauthorized communication between the trusted network and the Internet. A firewall may include screening routers, proxy servers and application-layer gateways.

For users on the internet to access protected services on the trusted network, they may be required to provide their identity to the firewall by some means such as entering a password or by computing a response to a challenge using a hardware token. With proper authentication, the user is allowed to pass through the firewall into the local network, but is typically limited to a predetermined set of services such as e-mail, FTP, etc.

Some local network managers place just outside the firewall a server, often referred to as a "sacrificial lamb" for storing non-confidential data which is easily accessible by the remote user but providing little security.

A De-Militarized Zone, or DMZ, sits between two firewalls protecting a trusted network. The external firewall protects servers in the DMZ from external threats while allowing HyperText Transfer Protocol (HTTP) requests. The internal firewall protects the trusted network in the event that one of the servers in the DMZ is compromised. Many companies use DMZs to maintain their web servers.

Another security technique for protecting computer networks is the issuance and use of public key certificates. Public key certificates are issued to a party by a certificate authority, which via some method validates the party's identity and issues a certificate stating the party's name and public key. As evidence of authenticity, the certificate authority digitally signs the party's certificate using the certificate authority's private key.

Thus, when a user via a client computer connects to a server, the client computer and server exchange public key certificates. Each party verifies the authenticity of the received certificates by using the certificate authority's public key to verify the signature of the certificate. Then, by encrypting messages with the server's public key the user can send secure communications to the server, and by encrypting messages with the user's public key the server can send secure communications to the user. Although any party might present a public key certificate, only the real user and the real host have the corresponding private key needed to decrypt the message. Examples of authentication and key distribution computer security systems include the Kerberos™ security system developed by the Massachusetts Institute of Technology and the NetSP™ security system developed by the IBM Corporation.

These security techniques cause problems for the roaming (traveling) user. The roaming user must maintain identification and authentication information such as passwords, certificates, keys, etc. and carry hardware tokens for responding to system challenges. Therefore, a system and method are needed for authenticating a roaming user easily and securely.

SUMMARY OF THE INVENTION

The present invention provides a system and method for authenticating the identity of a user in a computer network. The network system includes a server coupled via a computer network to a client. Upon receiving a request for access, the server sends an authentication applet to the client. The authentication applet includes a user identification (ID) module for obtaining a user ID and a password module for obtaining a client password. The authentication applet also includes a response generator coupled to the password module for using the client password as a variable in an algorithm to compute a client response. The authentication applet further includes a communications module coupled to the response generator and to the user ID module for sending the client response and the user ID back to the server for user authentication. The client uses an applet engine to execute the applet. The server uses the received user ID, the response and possibly user information to verify the identity of the user.

The method includes the steps of receiving a service request from a client, delivering to the client an authentication applet which when executed by the client uses client input as a variable in an algorithm to compute a response, receiving the response and a user ID from the client, and verifying the response. Verifying the response includes using the user ID and the challenge and possibly user information to verify the user.

It will be appreciated that the system and method of the present invention never send the password itself across the computer network and thus never compromise the password by transmission across unsecured channels. Further, the user need not maintain a hardware token configured to generate a proper response to a challenge. The user need only maintain the global server Uniform Resource Locator (URL), a user ID and a password needed to effect a proper response to a challenge by the applet. Thus, to access a service, the roaming user can use any computer terminal, which is connected to the computer network and capable of executing the applet.

BRIEF DESCRIPTION OF THE DRAWINGS

FIG. 1 is a block diagram illustrating a roaming-user network access system, in accordance with the present invention;

FIG. 2 is a block diagram illustrating details of an example client of FIG. 1;

FIG. 3 is a block diagram illustrating details of the global server of FIG. 1;

FIG. 4 is a block diagram illustrating details of an example service server of FIG. 1;

FIG. 5 is a flowchart illustrating a method for remotely accessing a secure service;

FIG. 6 is a flowchart illustrating details of the FIG. 5 step of creating a link between a client and the global server;

FIG. 7 illustrates an example web page;

FIG. 8A is a flowchart illustrating details of the FIG. 5 step of accessing a service in a first embodiment;

FIG. 8B is a flowchart illustrating details of the FIG. 5 step of accessing a service in a second embodiment;

FIG. 8C is a flowchart illustrating details of the FIG. 5 step of accessing a service in a third embodiment;

FIG. 9 is a block diagram illustrating a roaming-user network access system, in accordance with the present invention;

FIG. 10 is a block diagram illustrating details of the remote terminal of FIG. 9;

FIG. 11A is a block diagram illustrating details of the global server of FIG. 9;

FIG. 11B is a block diagram illustrating details of the authentication applet of FIG. 9;

FIG. 12 is a block diagram illustrating details of the network computer of FIG. 9;

FIG. 13 is a flowchart illustrating a method for remotely accessing a secure service;

FIG. 14 is a flowchart illustrating details of the FIG. 13 step of authenticating the remote terminal user in a first embodiment; and FIG. 15 is a flowchart illustrating details of the FIG. 13 step of authenticating the remote terminal user in a second embodiment.

DETAILED DESCRIPTION OF THE PREFERRED EMBODIMENT

FIG. 1 is a block diagram illustrating an exemplary roaming-user network access system 100 in accordance with the present invention. System 100 includes an interconnected network of computers referred to herein as an "Internet" 102. System 100 further includes a first company network 112, a second company network 118, a kiosk network 138 and an Internet Service Provider (ISP) network 143, each network being coupled to the Internet 102.

Company network 112 includes a firewall 116 coupled between the Internet 102 and a client computer 114a. Company network 118 includes a firewall 120 coupled between the Internet 102 and an internal network signal bus 126. Company network 118 further includes a first server 108a for providing a first service 110a, a second server 108b for providing a second service 110b, a first client computer 114b storing a program for providing a third service 110c and a second client computer 114c, each being coupled to signal bus 126. It will be appreciated that any of the client computers (i.e., client computers 114a, 114b, etc.) may be any computer, and any of the servers may be any computer coupled to and capable of being polled by any of the client computers. Example services for which services 110a–110d represent include an e-mail service program, an address book service program, a calendar service program, a paging service program, a company database service program, and any of the like.

The kiosk network 138 includes a first client computer 114d and a second client computer 114e, each being coupled together and to the Internet 102. The ISP network 143 includes an ISP 148 coupled via a wireless channel 146 to a first client computer 114f and coupled via modems 152 and 156 and via transmission line 154 to a second client computer 114g.

The Internet 102 includes a global server 106, which is protected by a global firewall 104 and includes a server 108c for providing a service 110d. Intercommunication between client computers 114a–114g and services 110a–110d is accomplished via the global server 106. If, for example, a user of any one of the client computers 114a–114g wants to access a service 110a–110d (which is provided at a location within system 100 that is unknown to the user), then the user applies a known Uniform Resource Locator (URL) to access a web page operated by global server 106. An example web page 700 is shown in and described with reference to FIG. 7. The global firewall 104 protects the global server 106 from external threats.

Before obtaining access privileges to the functionality provided by the global server 106, the user must first obtain authorization from the global server 106. Obtaining authorization typically requires user identification and authentication, for example, using public-key certificates. Once authenticated, the global server 106 provides the user with access to the services 110a–110d. It will be appreciated that varying levels of access to services 110a–110d will be granted based on varying strengths of identification and authentication and on the privacy of the communications channel.

To enable user access to and control of the services 110a–110d, the global server 106 may use conventional applets, servlets or agents in a distributed network environment, such as the Java™ distributed environment produced by the Netscape Corporation. The global server 106 provides the user's client with access to and control of the services 110a–110d. The global server 106 may redirect the user's client to access the services 110a–110d itself, the global server 106 may access the services 110a–110d itself and provide I/O to the client by proxy, or the global server 106 may provide the services 110a–110d itself. These three different modes of access to the services 110a–110d are described with reference to FIGS. 8A–8C.

The global server 106 maintains the network addresses of all the services 110a–110d, the user's public and private keys, the user's account numbers, firewall authentication information, etc. Firewall authentication information includes the necessary identification, passwords and certificates needed to pass firewalls 116 and 120. Accordingly, the user need only maintain the URL of the global server 106, and identification and authentication information such as a password or hardware token for obtaining access to the functionality of the global server 106. Thus, the roaming user can access computer services 110a–110d using any computer terminal, which is connected to the Internet 102.

FIG. 2 is a block diagram illustrating details of a client computer 114, such that each of clients 114a–114d is an instance of the client 114. The client 114 includes a Central Processing Unit (CPU) 210 such as a Motorola Power PCs microprocessor or an Intel Pentium® microprocessor. An input device 220 such as a keyboard and mouse, and an output device 230 such as a Cathode Ray Tube (CRT) display are coupled via a signal bus 240 to CPU 210. A communications interface 250, a data storage device 260 such as Read Only Memory (ROM) or a magnetic disk, and a Random-Access Memory (RAM) 270 are further coupled via signal bus 240 to CPU 210. The communications interface 250 of client computer 114 is coupled to the Internet 102 as shown in and described with reference to FIG. 1.

An operating system 280 includes a program for controlling processing by CPU 210, and is typically stored in data storage device 260 and loaded into RAM 270 for execution. Operating system 280 includes a communication engine 282 for generating and transferring message packets to and from the internet 106 via the communications interface 250.

Operating system 280 further includes an internet engine such as a web browser 284, e.g., the Netscape∩ web browser produced by the Netscape Corporation or the Internet Explorer™ web browser produced by the Microsoft Corporation. The web browser 284 includes an encryption engine 285 for encrypting messages using public and private keys, and an applet engine 286 for executing applets 288 downloaded from the global server 106 to enable the access to computer services 110a–110d. Downloaded applets 288 may include security applets 290 for performing services such as user identification and authentication, message integrity services, and certificate verification. The browser 284 further receives web page data 391 (FIG. 3), configuration data 390 and information identifying a set of selectable services 110a–110d, and uses the information to display the web page 700 (FIG. 7). The web browser 284 enables a user via the client 114a–114g to select one of the services 110a–110d for execution.

It will be appreciated that a client 114a–114g such as client 114b may include a service engine 490 (see FIG. 4) for providing a service 110a–110d such as service 110c. Thus, it is possible for a client 114b user to request access to service 110c via the global server 106, without knowing that the service 110c is provided by client 114b. Accordingly, the global server 106 will provide client 114 with an applet 288 for providing user interface I/O of service 110c back to client 114b.

FIG. 3 is a block diagram illustrating details of the global server 106, which includes a CPU 310 such as a Motorola Power PC™ microprocessor or an Intel Pentium® microprocessor. An input device 320 such as a keyboard and mouse, and an output device 330 such as a CRT display are coupled via a signal bus 340 to CPU 310. A communications interface 350, a data storage device 360 such as ROM or a magnetic disk, and a RAM 370 are further coupled via signal bus 340 to CPU 310. The communications interface 350 is conventionally coupled as part of the Internet 102 to the clients 114. Although the global server 106 is described as a single computer, it will be appreciated that the global server 106 may include multiple computers networked together.

Operating system 380 includes a program for controlling processing by CPU 310, and is typically stored in data storage device 360 and loaded into RAM 370 for execution. Operating system 380 includes a communication engine 382 for generating and transferring message packets to and from client computers 114 via the communications interface 350.

Operating system 380 further includes, as part of global firewall 104, security services 384 for opening a communications channel with users. For example, when a client attempts to access the global server 106, the security services 384 first determines whether the global server 106 accepts in-bound communications from a particular port (not shown) and whether the servlet host engine 386, described below, is authorized to connect to that particular port. If so, the security services 384 allows the communications engine 382 to open a communications channel via the particular port to the client 114a–114g. Otherwise, no channel will be opened.

The operating system 380 further includes a web engine 387 which, based on user's identification, the strength of the user's authentication and the privacy of the communications channel, forwards web page data 391 and information identifying a set of available services 110a–110d to the client 114a–114g. An example web page 700 is shown and described with reference to FIG. 7. The web engine 387 enables a user to select a service 110a–110d from the web page 700.

The web engine 387 includes a servlet host engine 386; which downloads security applets 290 including an authentication applet (not shown) to the client computer 114 and accordingly executes an authentication servlet 397 of servlets 398 for performing identification and authentication services. The authentication applet 290 prompts the user for identification and authentication information, and then communicates the information to the authentication servlet 397. The authentication servlet 397 verifies that the information is correct. It will be noted that the user's authentication information is not necessarily sent to the authentication servlet 397, but rather its existence and correctness is proven via a secure means such as a secure hash. The servlet host engine 386 further includes a secure communications engine 396, which may use public key certificates to negotiate a secure communications channel with the client computer 114.

Upon selection of a service 110a–110d, the servlet host engine 386 downloads a corresponding applet 388, corresponding configuration data 390 and corresponding user data 392 and may download corresponding service address information 394 to the client computer 114. Configuration data 390 includes information for configuring the user's web browser 284, for configuring the downloaded applets 288, and for configuring the selected service 110a–110d. Configuration is described in the related co-pending application referenced above. User data 392 may include user-and-service-specific information such as stored bookmarks, calendar data, pager numbers, etc. which was specifically stored on the global server 106 for easy access. Service address information 394 identifies the location of the services 110a–110d provided in system 100 by the global server 106. The client computer 114 executes the corresponding downloaded applet 288, which via the servlet host engine 386 (possibly using a corresponding servlet 398) enables the user to access and to control the corresponding services 110a–110d. The downloadable applets 388, configuration data 390, user data 392 and service address information 394 may be stored on the data storage device 360.

A keysafe 395 is a data file for storing each user's identification information, each user's public and private keys, each firewall's password information, etc. The keysafe 395 is organized in a linked list format so that, based on the selected service 110a–110d, the global server 106 can retrieve the appropriate firewall's password information, the appropriate user's identification information and keys, etc. The keysafe 395 may be stored on the data storage device 360.

FIG. 4 is a block diagram illustrating details of a service server 108, such that servers 108a–108c and client 114b are instances of server 108. Server 108 includes a CPU 410 such as a Motorola Power PC® microprocessor or an Intel Pentium® microprocessor. An input device 420 such as a keyboard and mouse, and an output device 430 such as a CRT display are coupled via a signal bus 440 to CPU 410. A communications interface 450, a data storage device 460 such as ROM or a magnetic disk, and a RAM 470 are further coupled via signal bus 440 to CPU 410. The communications interface 450 is coupled to the clients 114 as shown in and described with reference to FIG. 1.

The operating system 480 includes a program for controlling processing by CPU 410, and is typically stored in data storage device 460 and loaded into RAM 470 for execution. Operating system 480 also includes a communications engine 482 for generating and transferring message packets via the communications interface 450 to and from clients 114 or to and from global server 106. Operating system 480 further includes security services 484 for negotiating a secure channel with users, a secure communications engine 486 for opening the secure channel with the users, and a service engine 490 for providing a service 110a–110d to the users.

The service engine 490 includes a service interface 492 for receiving and translating messages to and from downloaded applets 288 currently executing on the client 114, and includes a service processor 494 and service data 496 for processing the service requests from the user. The service data 496 may include previously generated documents, database information, etc. It will be appreciated that the service data 496 is similar to the user data 392, such that it includes the same type of information but is maintained on the service server 108 instead of on the global server 108.

FIG. 5 is a flowchart illustrating a method for 500 enabling for a user to access services 110a–110d in computer network system 100. Method 500 begins by the client 114 in step 505 creating a communications link with the global server 106. Step 505 is described in greater detail below with reference to FIG. 6. The global server 106 in step 510 confirms that the user has privileges to access the functionality of the global server 106. Confirming user access privileges may include examining a user certificate, obtaining a secret password, using digital signature technology, etc. It will be appreciated that the security services 384 may cause the servlet host engine 386 to forward a security applet 389 via the communications channel to the client 114 for performing user authentication.

After user access privileges are confirmed, the web page engine 387 of the global server 106 in step 515 downloads web page data 391 and configuration data 390 to the client 114. The browser 284 of the client 114 in step 520 uses the web page data 391 and the configuration data 390 to display a web page 700 (FIG. 7) on the output device 230 of the client 114 and to enable access to the services 110a–110d which are offered by the global server 106. An example web page 700 is shown and described with reference to FIG. 7.

From the options listed on the web page 700, the user in step 525 via input device 220 selects a service 110a–110d.

In response, the servlet host engine 386 of the global server 106 in step 530 downloads the corresponding applet(s) 388, applet configuration data 390, user data 392 and possibly service address information 394 to the client 114. Applet configuration data 390 preferably includes user-specific preferences, such as user-preferred fonts, for configuring the selected service 110a–110d. User data 392 may include user-specific and service-specific information such as stored bookmarks, calendar data, pager numbers, etc. Service address information 394 identifies the location of the selected service 110a–110d. Alternatively, the corresponding applet(s) 388, applet configuration data 390, user data 392 and service address information 394 could have been downloaded in step 515 with the web page data 391 and the configuration data 390.

The applet engine 286 of the client 114 in step 535 executes the corresponding downloaded applet 288. The service server 108 in step 537 initiates the service engine 490. The global server 106 in step 538 selects one of the three modes of access described in FIGS. 8A–8C for enabling the client computer 114 to communicate with the corresponding service engine 490. For example, if the user selects the service 110d on server 108c, which is not protected by a separate firewall, then the global server 106 may provide the user with direct access. If the user selects service 110a provided by server 108a within company network 118, then the global server 106 may access the service 110a as a proxy for the user. It will be appreciated that each firewall 104 and 120 may store policies establishing the proper mode of access the global server 106 should select. Other factors for selecting mode of access may include user preference, availability and feasibility. The global server 106 in step 540 provides the client 114 user with access to the selected service 110a–110d. Step 540 is described in greater detail with reference to FIGS. 8A, 8B and 8C.

FIG. 6 is a flowchart illustrating details of step 505 (create link between client and global server), which begins by the client 114 user in step 605 using a known Uniform Resource Locator (URL) to call the global server 106. The global server 106 and the client 114 in step 607 create a secure communications channel therebetween, possibly by applying Secure Sockets Layer (SSL) technology. That is, the security services 384 of the global server 106 in step 610 determine if in-bound secure communications are permitted and, if so, create a communications channel with the client 114. The browser 284 of the client 114 and the security services 384 of the global server 106 in step 615 negotiate secure communications channel parameters, possibly using public key certificates. An example secure communications channel is RSA with RC4 encryption. It will be appreciated that the global server 106 may be configured to use one of ten encryption protocols and the client 114 may be enabled to use one of five encryption protocols. Step 615 thus may include selecting one of the encryption protocols, which is common to both the global server 106 and the client 114. The encryption engine 285 of the client 114 and secure communications engine 396 of the global server 114 in step 620 use the secure channel parameters to create the secure communications channel. Step 505 then ends.

FIG. 7 illustrates an example URL-addressable HyperText Markup Language (HTML)-based web page 700, as maintained by the servlet host engine 386. The web page 700 includes a title 710 "Web Page," a listing of the provided services 715 and a pointer 770 for selecting one of the provided services 715. As illustrated, the provided services 715 may include an e-mail service 720, a calendaring service 730, an internet access service 740, a paging service 750 and a fax sending service 760. Although not shown, other services such as bookmarking, QuickCard™, etc. may be included in the web page 700.

FIG. 8A is a flowchart illustrating details of step 540 (provide access to the service to the client user) in a first embodiment, referred to as method 540a, wherein the global server 106 provides the client 114 with a direct connection to the service 110a–110d. Method 540a begins by the downloaded applet 288 in step 805 retrieving the service address 394 of the selected service 110a–110d from data storage device 360 and the authentication information for the service 110a–110d from the keysafe 395. The communications engine 282 in step 810 creates a direct and secure connection with the communications engine 482 of the service server 108 at the retrieved service address, and uses the authentication information to authenticate itself. The applet 288 in step 815 acts as the I/O interface with the service engine 490, which is described in detail in the cross-referenced patent application. Method 540a then ends.

FIG. 8B is a flowchart illustrating details of step 540 (provide access to the service to the client user) in a second embodiment, referred to as method 540b, wherein the global server 106 acts for the client 114 as a proxy to the service 110a–110d. Method 540b begins with the applet 288 in step 840 retrieving the "service" address, which results in directing it to the global server 106. Thus, the applet 288 in step 845 creates a connection with the global server 106. The servlet host engine 386 of the global server 106 in step 850 retrieves the service address of the selected service 110a–110d and the authentication information for the selected service 110a–110d from the keysafe 395. The secure communications engine 396 of the global server 106 in step 855 negotiates secure channel parameters for creating a secure channel with the secure communications engine 486 of the service server 108.

Thereafter, the applet 288 in step 860 acts as the I/O interface (enables the user to make requests of the service engine 490) with the secure communications engine 396 of the global server 106. If the servlet host engine 386 in step 865 determines that it is unauthorized to perform a client 114 user's request, then the servlet host engine 386 in step 870 determines whether the method 540b ends, e.g., whether the user has quit. If so, then method 820b ends. Otherwise, method 540b returns to step 860 to obtain another request. If the servlet host engine 386 in step 865 determines that it is authorized to perform the client 114 user's request, then the servlet host engine 386, possibly using servlets 398, acts as the proxy for the client 114 to the service engine 490. As proxy, the servlet host engine 386 forwards the service request to the service 110a–110d for the applet 288 and forwards responses to the requesting applet 288 currently executing on the client 114. Method 540b then returns to step 870.

FIG. 8C is a flowchart illustrating details of step 540 (provide access to the service to the client user) in a third embodiment, referred to as method 540c, wherein the service 110a–110d being requested is located on the global server 106. Method 540c begins with the applet 288 in step 880 retrieving the service address for the service 110a–110d, which results in providing the applet 288 with the service address of the service 110a–110d on the global server 106. Thus, the applet 288 in step 882 creates a secure connection with the global server 106. No additional step of identification and authentication is needed since the client 114 has already identified and authenticated itself to the global server 106 in step 510 of FIG. 5.

In step 884, a determination is made whether the service 110a–110d is currently running. If so, then in step 886 a determination is made whether the service 110a–110d can handle multiple users. If not, then the global server 106 in step 890 creates an instance for the user, and the applet 288 in step 892 acts as the I/O interface with the service 110a–110d on the global server 106. Otherwise, if the service 110a–110d in step 886 determines that it cannot handle multiple users, then method 540c proceeds to step 892. Further, if in step 884 the global server 106 determines that the service 110a–110d is not currently running, then the global server 106 in step 888 initializes the service 110a–110d and proceeds to step 886.

FIG. 9 is a block diagram illustrating a roaming-user network access system 900 in an alternative embodiment in accordance with the present invention. Network access system 900 includes a remote terminal 905 coupled via computer network 910 to a Local Area Network (LAN) 915 and to a global server 920. The global server 920 is protected by a global firewall 925, and the LAN 915 is protected by a LAN firewall 930.

The remote terminal 905 includes a web engine 935 for communicating via computer network 910. The web engine 935 includes an applet engine 940 for executing applets downloaded from the computer network 910. Examples of web engines 935 having applet engines 940 include the Netscape™ web browser produced by the Netscape Corporation and the Internet Explorer™ web browser produced by the Microsoft Corporation.

LAN 915 includes a network computer 990, coupled to the LAN firewall 930 via a signal bus 985. The network computer 990 includes a service engine 993 for providing a service such as accessing e-mail, maintaining an address book, maintaining a calendar, sending and receiving pages, accessing a network database 997, etc. This service that is provided by service engine 993 may include one of the services 110a–110d (FIG. 1) that is provided by one of the service servers 108a–108c and 114b (FIG. 1). The LAN firewall 930 protects the LAN 915 from external threats.

The global server 920 includes a web page engine 975 enabling access to the network database 997 and to the service engine 993 and for providing an interface. As similarly stated above with reference to FIG. 1, intercommunication between the remote terminal 905 and the network computer 990 is accomplished via the global server 920. If, for example, a remote terminal 905 user wants to access the service engine 993, then the user applies a known Uniform Resource Locator (URL) to access a web page managed by the web page engine 975 which lists the available service provided by service engine 993. Further, to provide access and control of a service to a remote terminal 905 user, the global server 920 may use conventional applets, servlets or agents in a distributed network environment, such as the Java™ distributed environment produced by the Netscape Corporation. The global server 920 may provide the remote terminal 905 with direct access to the service, may access the service itself and provide I/O to the remote terminal 905 by proxy, or may provide the service itself. Providing access to a service is described in greater detail above with reference to FIGS. 1–8C.

The global server 920 further includes an authentication system 945 for authenticating a user requesting access, for example, to the web page. The authentication system 945 includes an applet host engine 950 for sending an authentication applet 955 and a challenge 965 to the remote terminal 905. The applet engine 940 on the remote terminal 905 executes the applet 955, which implements the corresponding challenge 965. The applet 955, in coordination with user input, computes and forwards a proper response to the challenge 965 back to the global server 920. The global server 920 verifies the response. For example, the global server 920 may retrieve and use user information 960 such as the user's password, a hash of the user's password or the user's public key to verify the response. It will be appreciated that varying levels of access to services will be granted based on the user's identification, on the varying strengths of authentication and on the privacy of the communications channel. The authentication applet 955 is described in greater detail with reference to FIG. 11B.

The global server 920 further includes security services 970 for establishing secure communications with the remote terminal 905 or with the service engine 993. The security services 970 are similar to the security services 384 described with reference to FIG. 3. It will be appreciated that the security services 970 may generate challenges 965 for the authentication system 945 to send to the remote terminal 905 with the authentication applet 955.

FIG. 10 is a block diagram illustrating details of the remote terminal 905, which is similar to each of the clients 114 described with reference to FIG. 2. The remote terminal 920 includes a Central Processing Unit (CPU) 1005 such as a Motorola Power PC® microprocessor or an Intel Pentium® microprocessor. An input device 1010 such as a keyboard and mouse, and an output device 1015 such as a Cathode Ray Tube (CRT) display are coupled via a signal bus 1020 to CPU 1005. A communications interface 1025, a data storage device 1030 such as Read Only Memory (ROM) or a magnetic disk, and a Random-Access Memory (RAM) 1035 are further coupled via signal bus 1020 to CPU 1005. The communications interface 1025 is coupled to the computer network 910 as shown in and described with reference to FIG. 9.

An operating system 1040 includes a program for controlling processing by CPU 1005, and is typically stored in data storage device 1030 and loaded into RAM 1035 (as illustrated) for execution. Operating system 1040 includes the web engine 935 for generating and transferring message packets via the communications interface 1025 to and from the computer network 910 possibly using encryption techniques such as public and private keys. As stated above with reference to FIG. 9, the web engine 935 includes an applet engine 940 for executing applets including the authentication applet 955 downloaded from the global server 920. Other downloadable applets (388, FIG. 3) to be executed by the applet engine 940 may include security applets for performing message integrity services and certificate verification.

The web engine 935 further receives web page data (391, FIG. 3), configuration data (390, FIG. 3) and data identifying the selectable service offered by the service engine 993. It will be appreciated that the selectable service may include one of the services 110a–110d (FIG. 1) offered by one of the service engines 108a–108c and 114b (FIG. 1). The web engine 935, uses the data to display the web page (e.g., the web page 700, FIG. 7). The web engine 935 enables a remote terminal 905 user to select the service for execution.

FIG. 11A is a block diagram illustrating details of the global server 920, which is similar to the global server 106 described with reference to FIG. 3. The global server 920 includes a CPU 1105 such as a Motorola Power PC® microprocessor or an Intel Pentium® microprocessor. An input device 1110 such as a keyboard and mouse, and an output device 1115 such as a CRT display are coupled via a signal bus 1120 to CPU 1105. A communications interface 1125, a data storage device 1130 such as ROM or a magnetic disk, and a RAM 1135 are further coupled via signal bus 1120 to CPU 1105. The communications interface 1125 is conventionally coupled to the computer network 910. Although the global server 920 is described as a single computer, it will be appreciated that the global server 920 may include multiple computers networked together.

An operating system 1140 includes a program for controlling processing by CPU 1105, and is typically stored in data storage device 1130 and loaded into RAM 1135 (as illustrated) for execution. Operating system 1140 includes the web page engine 975 for generating and transferring message packets via the communications interface 1125 to and from remote terminal 905. The web page engine 975 forwards web page data (391, FIG. 3), configuration data (390, FIG. 3) and data identifying a set of available services (110a–110d, FIG. 1) to the remote terminal 905. The web page engine 975 is similar to the web engine 387 (FIG. 3) of the global server 106. Operating system 1140 further includes the security services 970 for opening a secure communications channel with users.

The operating system 1140 further includes the applet host engine 950 which, before enabling the web page engine 975 to execute its routines, retrieves and forwards the authentication applet 955 and a corresponding challenge 965 to the remote terminal 905. It will be appreciated that upon a request for server 920 access the security services 970 may generate the challenge 960 and forward it to the applet host engine 950 to be forwarded with the authentication applet 955. As stated above, during execution, the authentication applet 955 prompts the user for identification (user ID) and a password, uses the password to compute a proper response, and forwards the identification and response to the authentication system 945. Computing a proper response is described in detail with reference to FIGS. 14 and 15.

The authentication system 945 uses the user ID and the challenge 960 to verify the user. For example, the authentication system 945 may use the user ID to retrieve a hash of the password from the user information 960, and then uses the hash of the password to verify the response. It will be appreciated that using a preferred embodiment of the present invention the password is not sent to the applet host engine 950, but rather its existence and correctness is proven via a secure means such as a secure hash. It will be further appreciated that the authentication applet 955 may communicate with an authentication servlet 397 (FIG. 3), which when executed by a servlet host engine 386 (FIG. 3) performs response verification.

FIG. 11B is a block diagram illustrating details of the authentication applet 955. Authentication applet 955 includes a user ID module 1150 for prompting a user for a user ID, and a password module 1155 for prompting a user for a password. The authentication applet 955 further includes a response generator 1160 for generating a response using the password input by the user and the challenge 965 sent to the remote terminal 905 with the authentication applet 955. Alternatively, the response generator 1160 may request the challenge 965 from the global server 920 after the user has input the password. The response generator 1160 generates the response by using the password and the challenge 965 as variables in an algorithm 1165. Exemplary algorithms 1165 are described in detail in FIGS. 14 and 15.

The authentication applet 955 further includes a communications module 1170 for communicating with the global server 920, e.g., for receiving the challenge 965 from the global server 920, for sending the response to the global server 920 for verification and for receiving from server 920 a verification signal indicating success or failure. The authentication applet 955 still further includes an access initiation module 1175 for enabling a user to access the functionality of the global server 920. The access initiation module 1175 is described in greater detail above with reference to FIGS. 1–8C.

FIG. 12 is a block diagram illustrating details of the network computer 990, which is similar to the service server 108 (FIG. 4) and may include all the same elements. The network computer 990 includes a CPU 1205 such as a Motorola Power PC® microprocessor or an Intel Pentium® microprocessor. An input device 1210 such as a keyboard and mouse, and an output device 1215 such as a CRT display are coupled via a signal bus 1220 to CPU 1205. A communications interface 1225, a data storage device 1230 such as ROM or a magnetic disk, and a RAM 1235 are further coupled via signal bus 1220 to CPU 1205. The communications interface 1225 is coupled to computer network 910 as shown in and described with reference to FIG. 9.

The operating system 1240 includes a program for controlling processing by CPU 1205, and is typically stored in data storage device 1230 and loaded into RAM 1235 (as illustrated) for execution. Operating system 1240 also includes a service engine 993 for providing a service to the users. The data storage device 1230 includes a network database 997 containing workspace data such as documents. e-mails, calendar information, files, etc.

FIG. 13 is a flowchart illustrating a method 1300 for enabling a user to access a service in computer network system 900. Method 1300 begins by the remote terminal 905 in step 1305 requesting logon to the global server 920. The global server 920 in step 1310 forwards an authentication applet 955 and a corresponding challenge 965 to the remote terminal 905. The applet engine 935 of the remote terminal 905 in step 1315 initiates execution of the authentication applet 955, which in coordination with the global server 920 in step 1320 identifies and authenticates the user. Step 1320 is described in greater detail with reference to FIGS. 14 and 15. After the user is identified and authenticated, the global server 920 in step 1325 enables the user to access the functionality offered by the global server 920, i.e., initiates access to the service provided by the service engine 993. Step 1325 is described in greater detail with reference to FIG. 5 (namely, steps 515–540) and FIGS. 8A–8C.

FIG. 14 is a flowchart illustrating a first method 1320a, which exemplifies details of step 1320 in a first embodiment for authenticating a user. Method 1320a begins with the communications module 1170 of the authentication applet 955 in step 1405 obtaining a challenge 965 from the authentication system 945 on the global server 920. It will be appreciated that the global server 920 may download the challenge 965 with the authentication applet 955 or may wait for the response generator 1160 to make a request before downloading the challenge 965.

In step 1410, the user ID module 1150 of the authentication applet 955 prompts the user for a user ID and the password module 1155 of the authentication applet 955 prompts the user for a password input. Upon receiving the password and the challenge 965, the response generator 1160 of the authentication applet 955 in step 1415 uses the password and the challenge 965 as variables in a one-way hash algorithm 1165 to compute the appropriate response. In a preferred embodiment, the response generator 1160 hashes a combination of the challenge 965 and a hash of the user's password to generate the response. In another preferred embodiment, the response generator 1160 hashes a combination of the challenge 965, a hash of the user's password and a modification factor (commonly referred to as "salt") which protects against "dictionary attacks" to generate the response. A dictionary attack is one that uses a dictionary list of words to generate a hash-to-password table, which can be used to misappropriate user passwords. The response generator 1160 in step 1420 instructs the communications module 1170 to send the user ID and the response via the communications interface 1025 to the authentication system 945. For convenience, the response generator 1160 may also send the challenge 965 with the response back to the authentication system 945.

The authentication system 945 in step 1425 uses the user ID and the challenge 965 to verify the response. For example, the authentication system 945 may use the user ID to retrieve a registered hash of the user's password from the user information 960. The authentication system 945 uses the challenge 965 and the registered hash of the user's password to perform the same one-way hash function and generate a verification response. Further, if the hash function included salt, then the authentication system 945 would apply the same salt when generating the verification response. It will be appreciated that the algorithm performed by the applet 955 and the algorithm performed by the authentication system 945 may not be the same.

If in step 1430 the authentication system 945 determines that the verification response computed by the authentication system 945 is the same as the response received from the authentication applet 955, then the user is successfully verified. Accordingly, the authentication system 945 in step 1435 informs the access initiation module 1175 of the authentication applet 955 of the success. The authentication system 945 in step 1437 authorizes the user to access the service provided by the service engine 993 during this session. It will be appreciated that providing access is described in greater detail with reference to FIGS. 1–8C. Method 1320a then ends. If unsuccessful, the authentication system 945 in step 1440 informs the access initiation module 1175 of the failure, and the access initiation module 1175 in step 1445 informs the user. Method 1320a then returns to step 1410.

FIG. 15 is a flowchart illustrating a second method 1320b, which exemplifies details of step 1320 in a second embodiment for authenticating a user. Method 1320b begins with the user ID module 1150 of the authentication applet 955 in step 1501 prompting the user for a user ID, and in step 1502 instructing the communications module 1170 to send the user ID to the authentication system 945 of the global server 920. The authentication system 945 in step 1503 uses the user ID to retrieve user information 960 such as the user's password or the user's public key, and uses the retrieved information to encrypt a token. The response generator 1160 of the authentication applet 955 in step 1505 obtains the encrypted token from the authentication system 945.

The password module 1155 of the authentication applet 955 in step 1510 prompts the user for a password or private key input. The response generator 1160 in step 1515 uses the password or private key and the predetermined algorithm 1165 to decrypt the encrypted token. The response generator 1160 in step 1520 uses a predetermined modification factor to modify the decrypted result, for example, by adding one to the token. The response generator 1160 in step 1525 uses the user's input or the public key of the server 920 and the algorithm 1165 to re-encrypt the modified token and to generate a corresponding response.

The response generator 1160 in step 1527 instructs the communications module 1170 to send the response to the authentication system 945. The authentication system 945 in step 1530 uses the user information 960 to verify the response. That is, the authentication system 945 uses the retrieved user's password, the retrieved user's public key or the private key of the server 920 and the predetermined algorithm 1165 to decrypt the response. The authentication system 945 then uses the same predetermined modification factor to modify the token and compares the modified token with the decrypted response.

If the authentication system 945 in step 1535 determines that the modified token is the same as the decrypted response, then the user is successfully verified. Accordingly, the authentication system 945 in step 1540 informs the access initiation module 1175 of the authentication applet 955 of the success. The authentication system 945 in step 1555 authorizes the user to access the service provided by the service engine 933. As stated above, access to the service is described in greater detail with reference to FIGS. 1–8C, and method 1320b then ends. However, if the authentication system 945 in step 1535 determines that the modified token is different than the decrypted response, then the authentication system 945 in step 1545 informs the access initiation module 1175 of the verification failure, and the access initiation module 1175 in step 1550 informs the user. Method 1320b then returns to step 1510.

The foregoing description of the preferred embodiments of the invention is by way of example only, and other variations of the above-described embodiments and methods are provided by the present invention. Although the system and method have been described with reference to applets, other downloadable executables such as Active X™ control developed by the Microsoft Corporation can alternatively be used. Further, although the authentication applet is being described with reference to a service accessing system, the authentication applet will operate with any computer system operating in a distributed environment requiring user authentication. Although the system and method have been described with reference to challenge/response-based authentication schemes, the authentication applet may incorporate any authentication technique. Components of this invention may be implemented using a programmed general-purpose digital computer, using application specific integrated circuits, or using a network of interconnected conventional components and circuits. The embodiments described herein have been presented for purposes of illustration and are not intended to be exhaustive or limiting. Many variations and modifications are possible in light of the foregoing teaching. The invention is limited only by the following claims.

What is claimed is:

1. A dynamic authentication system on a server computer system, comprising:

a user ID module for obtaining a user ID;

a password module for obtaining a password;

a response generator, coupled to the password module, for using the password as a variable in an algorithm to decrypt a token in response;

a communications module, coupled to the response generator and to the user ID module, for sending the response and the user ID to the server computer system from a client computer system;

a module for downloading the user ID module, the password module, the response generator and the communications module dynamically to a client computer system that requests access to the server computer system, enabling the server computer system to provide to the client computer system, after a different access request, a different algorithm for decrypting the token, each different algorithm for decrypting the token enabling a corresponding varying procedure for authenticating a user on the client computer system; and a module for determining whether the response and user ID authenticate a user on the client computer system.

2. The system of claim 1, wherein the user ID module obtains the user ID by prompting for user input.

3. The system of claim 1, wherein the password module obtains the password by prompting for user input.

4. The system of claim 1, wherein the algorithm includes a one-way hash function.

5. The system of claim 4, wherein the response generator receives a random challenge and uses the one-way hash function to hash the password and the random challenge together.

6. The system of claim 1, wherein the response generator uses a modification factor to modify the decrypted token.

7. The system of claim 6, wherein the response generator uses the password and the algorithm to re-encrypt the modified token and wherein the response includes the re-encrypted token.

8. The system of claim 1, wherein the response generator has a strength of authentication, and wherein the server computer system enables access to the server computer system based on the strength of the authentication.

9. The system of claim 8, wherein the server computer system request information identifying a strength of authentication from a user, and downloads the response generator associated with that information.

10. A dynamic authentication system on a server computer system, comprising:

first means for obtaining a user ID;

second means for obtaining a password;

third means, coupled to the second means, for using the password as a variable in an algorithm to decrypt a token in response;

fourth means, coupled to the first means and to the third means, for sending the response and the user ID to the server computer system from a client computer system;

fifth means for downloading the first means, the second means, the third means and the fourth means dynamically to a client computer system that requests access to the server computer system, enabling the server computer system to provide to the client computer system, after a different access request, a different algorithm for decrypting the token, each different algorithm for decrypting the token enabling a corresponding varying procedure for authenticating a user on the client computer system; and sixth means for determining whether the response and user ID authenticate a user on the client computer system.

11. The system of claim 10, wherein the first means obtains the user ID by prompting for user input.

12. The system of claim 10, wherein the second means obtains the password by prompting for user input.

13. The system of claim 10, wherein the algorithm includes a one-way hash function.

14. The system of claim 13, wherein the third means receives a random challenge and uses the one-way hash function to hash the password and the random challenge together.

15. The system of claim 10, wherein the third means uses a modification factor to modify the decrypted token.

16. The system of claim 15, wherein the third means uses the password and the algorithm to re-encrypt the modified token and wherein the response includes the re-encrypted token.

17. A computer-readable storage medium on a server computer system storing dynamically downloadable program code for causing a client computer system to perform the steps of:
 obtaining a user ID;
 obtaining a password;
 using the password as a variable in an algorithm to decrypt a token in response;
 sending the response and the user ID to the server computer system from the client computer system, the dynamically downloadable program code enabling the server computer system to provide to the client computer system, after a different access request, a different algorithm for decrypting the token, each different algorithm for decrypting the token enabling a corresponding varying procedure for authenticating a user on the client computer system.

18. A computer-based authentication method, comprising the steps of:
 requesting access to a server computer system;
 receiving, after the step of requesting, downloaded program code dynamically from the server computer system;
 initiating execution of the program code;
 obtaining, by the program code, a user ID;
 obtaining, by the program code, a corresponding password;
 using, by the program code, the password as a variable in an algorithm to decrypt a token in response; and
 sending, by the program code, the response and the user ID to the server computer system, the server computer system verifying the response to authenticate the user, enabling the server computer system to provide to the client computer system, after a different access request, a different algorithm decrypting the token, each different algorithm for decrypting the token enabling a corresponding varying procedure for authenticating a user on the client computer system.

19. The method of claim 18, wherein the step of obtaining the user ID includes prompting for user input.

20. The method of claim 18, wherein the step of obtaining the password includes prompting for user input.

21. The method of claim 18, wherein the algorithm includes a one-way hash function.

22. The method of claim 21, further comprising the step of receiving a random challenge and wherein the step of using the password includes using the one-way has function to hash the password and the random challenge together.

23. The method of claim 18, wherein the algorithm includes using a modification factor to modify the decrypted token.

24. The method of claim 23, wherein the algorithm uses the password to re-encrypt the modified token and wherein the response includes the re-encrypted token.

25. A dynamic authentication system on a server computer system, comprising:
 an engine for receiving a service request from a client;
 a password database storing a first password; and
 an authentication program, coupled to the engine and to the password database, for downloading dynamically to the client authentication code, which when executed by the client uses a client password as a variable in an algorithm to decrypt a token response, for receiving the client response from the client, and for using the first password to verify the client response, enabling the server computer system to provide to the client, after a different access request, a different algorithm for decrypting the token, each different algorithm for decrypting the token enabling a corresponding varying procedure for authenticating a user on the client computer system.

26. The method of claim 25, wherein the service request includes a request to access the contents of a server.

27. The method of claim 25, wherein the password database further stores a first user ID corresponding to the first password.

28. The system of claim 27, wherein the authentication program includes a user ID module for obtaining and sending a client user ID back to the authentication program.

29. The System of claim 28, wherein the authentication program compares the client user ID with the first user ID to retrieve the first password from the password database.

30. The system of claim 29, wherein the authentication program uses the first password as a variable in the algorithm to compute a verification response and compares the verification response with the client response.

31. The system of claim 30, wherein the authentication program grants the service request when the verification response is the same as the client response.

32. The system of an claim 25, wherein the algorithm includes a one-way hash function.

33. The system of claim 32, wherein the authentication program forwards a random challenge to the client and the one-way hah function hashes the client password and the random challenge together.

34. The system of claim 25, wherein the authentication program uses the first password to encrypt a token and forwards the encrypted token to the client.

35. The system of claim 34, wherein the authentication applet includes a response generator for using the client password and the algorithm to decrypt the encrypted token.

36. The system of claim 35, wherein the response generator uses a modification factor to modify the decrypted token.

37. The system of claim 36, wherein the response generator uses the client password and the algorithm to re-encrypt the modified token and wherein the response includes the re-encrypted token.

38. A dynamic authentication system on a server computer system, comprising:
 first means for receiving a service request from a client;
 second means, coupled to the first means, for downloading dynamically to the client authentication code, which when executed by the client uses client input as a variable in an algorithm to decrypt a token in response, enabling the server computer system to provide to the client, after a different access request, a different algorithm for decrypting the taken, each different algorithm for decrypting the token enabling a corresponding varying procedure for authenticating a user on the client computer system;
 third means, coupled to the second means, for receiving the token from the client; and
 fourth means, coupled to the third means, for verifying the token.

39. A computer-readable storage medium storing program code for causing a server computer system to perform the steps of:

receiving a service request from a client;

downloading dynamically to the client authentication code, which when executed by the client uses client input as a variable in an algorithm to decrypt a token, enabling the server computer system to provide to the client, after a different access request, a different algorithm for detecting the token, each different algorithm for decrypting the token enabling a corresponding varying procedure for authenticating a user on the client computer system;

receiving the token from the client; and verifying the token.

40. A computer-based method in a server computer system, comprising the steps of:

receiving a service request from a client;

downloading dynamically to the client authentication code, which when executed by the client uses client input as a variable in an algorithm to decrypt a token in response, enabling the server computer system to provide to the client, after a different access request, a different algorithm for decrypting the token, each different algorithm for decrypting the token enabling a corresponding varying procedure for authenticating a user on the client computer system;

receiving the client response from the client; and verifying the client response.

41. The method of claim 40, wherein the service request includes a request to access the contents of a server.

42. The method of claim 40, further comprising the step of storing a first password in a password database.

43. The method of claim 42, further comprising the step of storing a first user ID corresponding to the first password in the password database.

44. The method of claim 43, wherein the authentication code includes a user ID module for obtaining and sending a client user in back to the server.

45. The method of claim 44, comprising the step of comparing the client user ID with the first user ID to retrieve the first password from the password database.

46. The method of claim 45, further comprising the steps of using the first password as a variable in the algorithm to compute a verification response and comparing the verification response with the client response.

47. The method of claim 46, further comprising the step of granting the service request when the verification response is the same as the client response.

48. The method of claim 40, wherein th algorithm includes a one-way hash function.

49. The method of claim 48, further comprising forwarding a random challenge to the client and wherein the one-way hash function hashes the password and the random challenge together.

50. The method of claim 40, further comprising the steps of using the first password to encrypt a token and forwarding the encrypted token to the client.

51. The method of claim 50, wherein the authentication code includes a response generator for using the client password and the algorithm to decrypt the encrypted token.

52. The method of claim 51, wherein the response generator uses a modification factor to modify the decrypted token.

53. The method of claim 52, the response generator uses the client password and the algorithm to re-encrypt the modified token and wherein the response includes the re-encrypted token.

54. A method of authentication in a client computer system, comprising:

receiving authentication code dynamically from a server computer system; and executing the authentication code, which causes obtaining a user ID and a password from a user;

using the password as a variable in an algorithm to decrypt a token; and sending the user ID and the token to the server computer system, the server computer system verifying the token to authenticate the user, enabling the server computer system to provide to the client, after a different access request, a different algorithm for decrypting the token, each different algorithm for decrypting the token enabling a corresponding varying procedure for authenticating a user on the client computer system.

* * * * *